US008831090B2

(12) United States Patent
Martz et al.

(10) Patent No.: US 8,831,090 B2
(45) Date of Patent: Sep. 9, 2014

(54) METHOD, SYSTEM AND APPARATUS FOR IMAGE CAPTURE, ANALYSIS AND TRANSMISSION

(75) Inventors: Andrew Martz, Vancouver (CA); Ross Wightman, Vancouver (CA); Shaun P. Marlatt, Vancouver (CA)

(73) Assignee: Avigilon Corporation, Vancouver (CA)

( * ) Notice: Subject to any disclaimer, the term of this patent is extended or adjusted under 35 U.S.C. 154(b) by 1380 days.

(21) Appl. No.: 12/273,505

(22) Filed: Nov. 18, 2008

(65) Prior Publication Data
US 2010/0124271 A1 May 20, 2010

(51) Int. Cl.
*H04N 7/12* (2006.01)
(52) U.S. Cl.
USPC .................................................. 375/240.01
(58) Field of Classification Search
CPC .......... H04N 7/17309; H04N 7/26255; H04N 7/26643; H04N 21/236
USPC .................................................. 375/240.01
See application file for complete search history.

(56) References Cited

U.S. PATENT DOCUMENTS

| 5,764,235 | A | 6/1998 | Hunt et al. |
|---|---|---|---|
| 6,172,672 | B1 | 1/2001 | Ramasubramanian et al. |
| 6,310,601 | B1 | 10/2001 | Moore et al. |
| 7,058,721 | B1 | 6/2006 | Ellison et al. |
| 7,099,040 | B1 * | 8/2006 | Cooper et al. ................. 358/1.9 |
| 7,191,462 | B1 | 3/2007 | Roman et al. |
| 7,206,804 | B1 | 4/2007 | Deshpande et al. |
| 7,260,614 | B2 | 8/2007 | Deshpande et al. |
| 7,315,386 | B1 | 1/2008 | Shiimori et al. |
| 7,340,151 | B2 | 3/2008 | Taylor et al. |
| 7,362,970 | B2 | 4/2008 | Atsumi et al. |
| 7,401,116 | B1 | 7/2008 | Chalfin et al. |
| 2004/0145660 | A1 * | 7/2004 | Kusaka ...................... 348/211.2 |
| 2004/0223058 | A1 | 11/2004 | Richter et al. |
| 2005/0120128 | A1 | 6/2005 | Willes et al. |
| 2006/0005223 | A1 | 1/2006 | Weng et al. |
| 2006/0167987 | A1 * | 7/2006 | Yamane ......................... 709/203 |
| 2006/0279628 | A1 * | 12/2006 | Fleming ........................ 348/143 |
| 2007/0107034 | A1 * | 5/2007 | Gotwals ......................... 725/129 |
| 2007/0113261 | A1 | 5/2007 | Roman et al. |
| 2008/0107174 | A1 | 5/2008 | Roman |
| 2010/0023573 | A1 * | 1/2010 | Boersma et al. .............. 708/495 |
| 2010/0058396 | A1 * | 3/2010 | Russell et al. .................. 725/60 |

FOREIGN PATENT DOCUMENTS

| JP | 2003199100 A | 7/2003 |
|---|---|---|
| WO | WO2006066077 A2 | 6/2006 |

\* cited by examiner

*Primary Examiner* — Matthew Smithers
(74) *Attorney, Agent, or Firm* — Klarquist Sparkman, LLP

(57) ABSTRACT

A method, system and apparatus for image capture, analysis and transmission are provided. A link aggregation method involves identifying controller network ports to a source connected to the same subnetwork; producing packets associating corresponding controller network ports selected by the source CPU for substantially uniform selection; and transmitting the packets to their corresponding network ports. An image analysis method involves producing by a camera an indication whether a region of an image differs by a threshold extent from a corresponding region of a reference image; transmitting the indication and image data to a controller via a communications network; and storing at the controller the image data and the indication in association therewith. The controller may perform operations according to positive indications. A transmission method involves receiving user input in respect of a video stream and transmitting, in accordance with the user input, selected data packets of selected image frames thereof.

40 Claims, 13 Drawing Sheets

METHOD, SYSTEM AND APPARATUS FOR IMAGE CAPTURE, ANALYSIS AND TRANSMISSION

BACKGROUND OF THE INVENTION

1. Field of Invention

This invention relates to multi-apparatus electronic systems and, in particular, to a method, system and apparatus for image capture, analysis and transmission.

2. Description of Related Art

Link aggregation (also known as trunking or inverse multiplexing) refers to the use of multiple network paths in a communications link to increase data transmission speed, reliability through the use of redundant transmission, or increase both speed and reliability of the link beyond that of a comparable link having a single network path.

Communications equipment specifically capable of providing link aggregation has been manufactured by various equipment manufacturers, however, such components are limited to use with interconnecting equipment from the same manufacturer or even the same product line. U.S. Pat. No. 5,608,733 to Vallee et al. discloses ATM (Asynchronous Transfer Mode) inverse multiplexing in which digital data in ATM cells are sent to a destination node over more than one transmission link in round robin fashion, however, such ATM inverse multiplexing requires the use of a protocol calling for a physical layer OAM (Operation Administration and Maintenance) cell that is defined to be exclusively processed by the ATM inverse multiplexers.

Some communications equipment constitute multi-port network interfaces having link aggregation capabilities. Such network interfaces comprise a network interface card and associated device driver software, but require the installation and configuration of device driver layer software specific to and compatible with specific multi-port network interface cards having link aggregation capabilities. The U.S. Pat. No. 6,873,630 issued to Muller et al. discloses a multi-gigabit ethernet architecture in which a communication for transmission across a network by a first network entity is divided for transmission across multiple channels at a point below the Medium Access Control (MAC) layer of operation. However, such architecture requires the use of hardware components having compatible link aggregation capabilities below the MAC layer of operation.

Some multi-port network interfaces provide link aggregation by emulating a single port network interface. Such emulating network interfaces redirect a network packet received from a source entity to one of the multiple paths by overwriting specific header information of the network packet; and direct a network packet received from one of the multiple network paths to the destination entity by overwriting header information of the network packet to make it appear to the destination entity as if transmission had occurred via a single port network interface. However, such emulating network interfaces introduce transmission inefficiencies by their need to overwrite header information of the network packets being transmitted.

Some operating systems include kernel functions that support the use of multi-port network interface cards for link aggregation, however, such operating systems are limited to the use of multi-port network interface cards specifically compatible with the particular kernel of the operating system.

Thus, there is a need for scalable link aggregation techniques not limited by the compatibility requirements of prior systems and by the need for installation and configuration of specific communications equipment or network interfaces themselves having link aggregation capabilities.

Image analysis refers to producing meaningful data and information in response to images. Digital Video Recorders (DVR) digitally record video signals received in analog format via cable connection from one or more cameras.

U.S. Pat. No. 7,340,151 issued to Taylor et al. discloses a method by which a DVR, at the time of storing a received video signal, also generates and stores metadata identifying spatial regions of motion. The method involves creating a spatial grid of zones and assigning a bit value to one motion bit for each zone, thereby indicating the presence or absence of motion in each zone. The motion bits can be logically "OR'd" to facilitate subsequent processing. However, the method of Taylor et al. is limited to generating metadata in a DVR that is directly connected by cable to a camera transmitting an analog video signal across the cable connection. Thus, the DVR is not suitable for use in systems where images captured by a camera are transmitted across a communications network.

Transmitting a video from a server to a client computer by streaming data packets of the video permits the client computer to display images of the video in a viewing window on a monitor connected to the client computer. The viewing window has a viewing window area measured in width of pixels by height of pixels. For example, a viewing window that is 800 pixels wide by 600 pixels high has a viewing window area of 0.48 Megapixels (MP). The viewing window area is a measure of the image size being displayed. Video images can be captured, transmitted and displayed at a frame rate, measured in frames/second (fps).

U.S. Pat. No. 6,172,672 issued to Ramasubramanian et al. discloses a method and system for delivering video from a server to a client over a communication medium with a limited bandwidth. Different versions of a video are stored as pre-compressed video files using different compression ratios. The server is configured to switch between video file sources to provide increased quality slow motion video at a second, slower frame rate than an initial predetermined frame rate, or to provide still "snapshot" of a particular frame selected from a least-compressed video file. If pre-compressed video data is not pre-compressed to the degree required to be able to transmit the video to a client for normal-speed playback in real time, some additional on-the-fly compression must be performed to send the video to the client for normal-speed, real-time playback. However, transmission efficiency is not optimized by the method and system of Ramasubramanian et al.

Objects of the invention include addressing the above shortcomings.

SUMMARY

The above shortcomings may be addressed by providing, in accordance with one aspect of the invention, a method of transmitting data by scalable link aggregation from a source device having a central processing unit to a controller device, the source device and the controller device being connected to a communications network and associated with a subnetwork of the communications network. The method involves: (a) identifying by the controller device to the source device one or more network ports of the controller device; (b) producing by the source device a plurality of network packets comprising the data, each of the network packets being associated with a corresponding network port of the one or more network ports, the corresponding network port being selected by the central processing unit for substantially uniform selection of the one or more network ports; and (c) transmitting each network packet from the source device to the corresponding network port, respectively.

Producing by the source device a plurality of network packets comprising the data, each of the network packets being associated with a corresponding network port of the one or more network ports, the corresponding network port being selected by the central processing unit for substantially uniform selection of the one or more network ports, may involve selecting the corresponding network port by round robin selection. Transmitting each network packet from the source device to the corresponding network port, respectively, may involve transmitting each network packet from the source device to a switching device operable to direct each network packet to the controller device at the corresponding network port, respectively. Identifying by the controller device to the source device one or more network ports of the controller device may involve identifying the one or more network ports to a camera. Producing by the source device a plurality of network packets comprising the data, each of the network packets being associated with a corresponding network port of the one or more network ports, the corresponding network port being selected by the central processing unit for substantially uniform selection of the one or more network ports, may involve producing by the camera the plurality of network packets in response to image data produced by the camera, the image data representing a plurality of images captured by the camera. Producing by the camera the plurality of network packets in response to image data produced by the camera, the image data representing a plurality of images captured by the camera, may involve compressing digital representations of the plurality of images. Producing by the source device a plurality of network packets comprising the data, each of the network packets being associated with a corresponding network port of the one or more network ports, the corresponding network port being selected by the central processing unit for substantially uniform selection of the one or more network ports, may involve selecting by the central processing unit of the camera the corresponding network port by round robin selection. The method may further involve producing by the camera an indication whether a region of an image of the plurality of images differs from a corresponding region of a reference image by a threshold extent; and wherein producing by the source device a plurality of network packets comprising the data comprises producing the plurality of network packets in response to the indication and a portion of the image data representing the image.

In accordance with another aspect of the invention, there is provided a computer program product comprising computer-executable instructions embodied in a computer-readable medium for performing a method of transmitting data by scalable link aggregation from a source device having a central processing unit to a controller device, the source device and the controller device being connected to a communications network and associated with a subnetwork of the communications network. The method involves: (a) identifying by the controller device to the source device one or more network ports of the controller device; (b) producing by the source device a plurality of network packets comprising the data, each of the network packets being associated with a corresponding network port of the one or more network ports, the corresponding network port being selected by the central processing unit for substantially uniform selection of the one or more network ports; and (c) transmitting each network packet from the source device to the corresponding network port, respectively.

In accordance with another aspect of the invention, there is provided a method of analyzing a plurality of images captured by a camera, the method comprising: (a) producing by the camera an indication whether a region of an image of the plurality of images differs from a corresponding region of a reference image by a threshold extent; (b) transmitting by the camera via a communications network to a controller device the indication and image data representing the image; and (c) storing by the controller device the image data and the indication in association therewith.

The method may further involve producing by the camera scaled image data associated with the image. Producing by the camera an indication whether a region of an image of the plurality of images differs from a corresponding region of a reference image by a threshold extent may involve comparing a pixel of the scaled image data with a corresponding pixel of scaled reference image data representing the reference image. Producing by the camera scaled image data associated with the image may involve scaling down digital representations of each of the plurality of images. Producing by the camera an indication whether a region of an image of the plurality of images differs from a corresponding region of a reference image by a threshold extent may involve setting a digital bit to indicate whether the pixel differs from the corresponding pixel by the threshold extent, thereby indicating whether motion is occurring within the region. The method may involve receiving by the camera from the controller device the value of a user configurable threshold defining the threshold extent. The method may involve performing by the controller device, if the indication is positive, one or more operations selected from the group consisting of: (i) storing at least a portion of the image data, the portion being associated with the region; (ii) displaying the portion; (iii) performing one or more image analysis operations on the portion; (iv) producing a user message; and (v) producing a signal for triggering an event. Performing by the controller device, if the indication is positive, one or more operations, selected from the group consisting of: storing at least a portion of the image data, the portion being associated with the region; displaying the portion; performing one or more image analysis operations on the portion; producing a user message; and producing a signal for triggering an event, may involve performing a selected operation if the indication indicates motion occurring within the region. Producing a signal for triggering an event may involve producing an actuation signal for actuating an external device. The method may involve producing the image data by compressing a digital representation of the image. Producing by the camera an indication whether a region of an image of the plurality of images differs from a corresponding region of a reference image by a threshold extent may involve selecting as the reference image a consecutive image captured by the camera immediately prior to capturing the image. Transmitting by the camera via a communications network to a controller device the indication and image data representing the image may involve transmitting the indication and the image data by scalable link aggregation when the camera and the controller device are each associated with a subnetwork of the communications network.

In accordance with another aspect of the invention, there is provided a system for analyzing a plurality of images. The system includes: (a) imaging means for capturing the plurality of images, the imaging means being operable to produce image data representing an image of the plurality of images and to produce an indication whether a region of the image differs from a corresponding region of a reference image; (b) switching means for receiving from the imaging means the indication and the image data, the switching means being operable to direct the indication and the image data to controller means via a communications network; and (c) the controller means operable to store the image data and the indication in association therewith.

Controller means may be operable to perform, if the indication is positive, one or more operations selected from the group consisting of: (i) storing at least a portion of the image data, the portion being associated with the region; (ii) displaying the portion; (iii) performing one or more image analysis operations on the portion; (iv) producing a user message; and (v) producing a signal for triggering an event. The imaging means and the controller means may be associated with a subnetwork of the communications network. The controller means may include one or more network ports. The imaging means may include processing means operable to produce the indication. The processing means may be operable to produce a plurality of network packets comprising the image data and the indication. The processing means may be operable to associate each the network packet with a corresponding network port of the one or more network ports. The imaging means may be operable to transmit the plurality of network packets to the switching means. The switching means may be operable to direct the each network packet to the controller means at the corresponding network port, respectively.

In accordance with another aspect of the invention, there is provided a camera. The camera includes: (a) an image sensor for capturing a plurality of images; (b) a processor for producing image data in response to an image of the plurality of images, the processor being operable to produce an indication whether a region of the image differs from a corresponding region of a reference image by a threshold extent; and (c) a network interface for transmitting to a controller device via a communications network the image data and the indication. The processor may be operable to produce scaled image data by scaling down the image data. The processor may be operable to compare a pixel of the scaled image data with a corresponding pixel of scaled reference image data representing the reference image. The processor may be operable to set a digital bit to indicate whether the pixel differs from the corresponding pixel by the threshold extent such that the digital bit indicates whether motion is occurring within the region. The processor may be operable to determine the value of a user configurable threshold defining the threshold extent. The processor may be operable to receive the value from the controller device. The processor may be operable to produce compressed data by compressing a digital representation of the image. The camera may be operable to transmit the compressed data to the controller device by scalable link aggregation when the camera and the controller device are each associated with a subnetwork of the communications network.

In accordance with another aspect of the invention, there is provided a method of streaming a video, the video including a plurality of image frames having associated therewith a source frame rate, each of the image frames having associated therewith a source pixel resolution, each of the image frames including a plurality of data packets. The method involves: receiving as user input a viewing area of a viewing window, an image region, and a display quality bias; and transmitting a selection of the image frames and, for each of the selected image frames, transmitting a data packet selection of the data packets associated only with the image region and a pixel resolution determined in response to the viewing area, the display quality bias and the source pixel resolution.

The method may involve receiving as user input a chromatic specification selected from the group consisting of a monochromatic selection and a colour selection. The method may involve transmitting only monochrome information of the video stream if the chromatic specification is selected as the monochrome selection. The method may involve receiving as user input the display quality bias selected from the group consisting of: a maximum quality, a high quality, a medium quality and a low quality. The method may involve determining a permitted pixel resolution equal to the source pixel resolution divided by the result of four raised to an integer power. The method may involve determining the integer power such that the permitted pixel resolution is equal to a particular the permitted pixel resolution closest to and greater than or equal to the viewing area if the display quality bias is selected as the maximum quality, equal to one fourth of the particular permitted pixel resolution if the display quality bias is selected as the high quality, equal to one sixteenth of the particular permitted pixel resolution if the display quality bias is selected as the medium quality and equal to one sixty-fourth of the particular permitted pixel resolution if the display quality bias is selected as the low quality. The method may further involve assigning the pixel resolution to the lesser of the permitted pixel resolution and the source pixel resolution. The method may involve selecting the selection of the image frames such that a stream bandwidth limit is not exceeded. Selecting the selection of the image frames such that a stream bandwidth limit is not exceeded may involve receiving as user input a bandwidth limit associated with a transmission link, and setting the stream bandwidth limit equal to the bandwidth limit divided by a number of the videos being transmitted via the transmission link. Selecting the selection of the image frames such that a stream bandwidth limit is not exceeded may involve determining a frame size of the data packet selection, determining a frame rate limit equal to the stream bandwidth limit divided by the frame size, selecting the image frames if the frame rate limit is greater than or equal to the source frame rate, and, if the frame rate limit is less than the source frame rate, selecting a subset of the image frames such that a transmission rate of the subset is less than or equal to the frame rate limit. The method may involve selecting the subset so as to produce a substantially uniform temporal distribution of the selected image frames. Determining a frame size of the data packet selection may involve determining an average frame size associated with a plurality of the selected image frames.

In accordance with another aspect of the invention, there is provided a system for streaming a video, the video including a plurality of image frames having associated therewith a source frame rate, each of the image frames having associated therewith a source pixel resolution, each of the image frames including a plurality of data packets. The system includes: (a) a client operable to receive as user input a viewing area of a viewing window, an image region, and a display quality bias; and (b) a controller device operable to transmit a selection of the image frames to the client and, for each of the selected image frames, transmitting a data packet selection of the data packets associated only with the image region and a pixel resolution determined in response to the viewing area, the display quality bias and the source pixel resolution.

The client may be operable to receive as user input a chromatic specification selected from the group consisting of a monochromatic selection and a colour selection. The controller device may be operable to transmit monochrome information only of the video stream when the chromatic specification is selected as the monochrome selection. The client may be operable to receive as user input the display quality bias selected from the group consisting of: a maximum quality, a high quality, a medium quality and a low quality. The client may be operable to determine a permitted pixel resolution equal to the source pixel resolution divided by the result of four raised to an integer power. The client may be operable to determine the integer power such that the permitted pixel resolution is equal to a particular the permitted pixel resolution closest to and greater than or equal to the viewing area if the display quality bias is selected as the maximum quality, equal to one fourth of the particular permitted pixel resolution if the display quality bias is selected as the high quality, equal to one sixteenth of the particular permitted pixel resolution if the display quality bias is selected as the medium quality and equal to one sixty-fourth of the particular permitted pixel resolution if the display quality bias is selected as the low quality. The client may be operable to assign the pixel resolution to the lesser of the permitted pixel resolution and the source pixel resolution. The client may be operable to communicate to the controller device the pixel resolution. The controller device may be operable to select the selection of the image frames such that a stream bandwidth limit is not exceeded. The client may be operable to receive as user input a bandwidth limit associated with a transmission link. The client may be operable to set the stream bandwidth limit equal to the bandwidth limit divided by a number of the videos being received by the client via the transmission link. The client may be operable to communicate to the controller device the stream bandwidth limit. The controller device may be operable to determine a frame size of the data packet selection. The controller device may be operable to determine a frame rate limit equal to the stream bandwidth limit divided by the frame size. The controller device may be operable to select the image frames if the frame rate limit is greater than or equal to the source frame rate. The controller device may be operable to, if the frame rate limit is less than the source frame rate, select a subset of the image frames such that a transmission rate of the subset is less than or equal to the frame rate limit. The controller device may be operable to select the subset so as to produce a substantially uniform temporal distribution of the selected image frames. The controller device may be operable to determine an average frame size associated with a plurality of the selected image frames.

In accordance with another aspect of the invention, there is provided a system for streaming a video, the video including a plurality of image frames having associated therewith a source frame rate, each of the image frames having associated therewith a source pixel resolution, each of the image frames including a plurality of data packets. The system includes: (a) receiving means for receiving as user input a viewing area of a viewing window, an image region, and a display quality bias; and (b) transmitting means for transmitting a selection of the image frames and, for each of the selected image frames, transmitting a data packet selection of the data packets associated only with the image region and a pixel resolution determined in response to the viewing area, the display quality bias and the source pixel resolution.

The receiving means may be operable to receive as user input a chromatic specification selected from the group consisting of a monochromatic selection and a colour selection. The transmitting means may be operable to transmit monochrome information only of the video stream when the chromatic specification is selected as the monochrome selection. The system may include data packet selecting means for selecting the data packet selection. The system may include frame selecting means for selecting the selected image frames.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

A system for analyzing a plurality of images includes: imaging means for capturing said plurality of images, said imaging means being operable to produce image data representing an image of said plurality of images and to produce an indication whether a region of said image differs from a corresponding region of a reference image; switching means for receiving from said imaging means said indication and said image data, said switching means being operable to direct said indication and said image data to controller means via a communications network; and said controller means operable to store said image data and said indication in association therewith. The controller means may be operable to perform, if said indication is positive, one or more operations selected from the group consisting of: storing at least a portion of said image data, said portion being associated with said region; displaying said portion; performing one or more image analysis operations on said portion; producing a user message; and producing a signal for triggering an event. The imaging means may comprise processing means operable to produce said indication. The imaging means may comprise processing means operable to produce a plurality of network packets comprising said image data and to associate each said network packet with a corresponding network port of said controller means.

Figure 1:
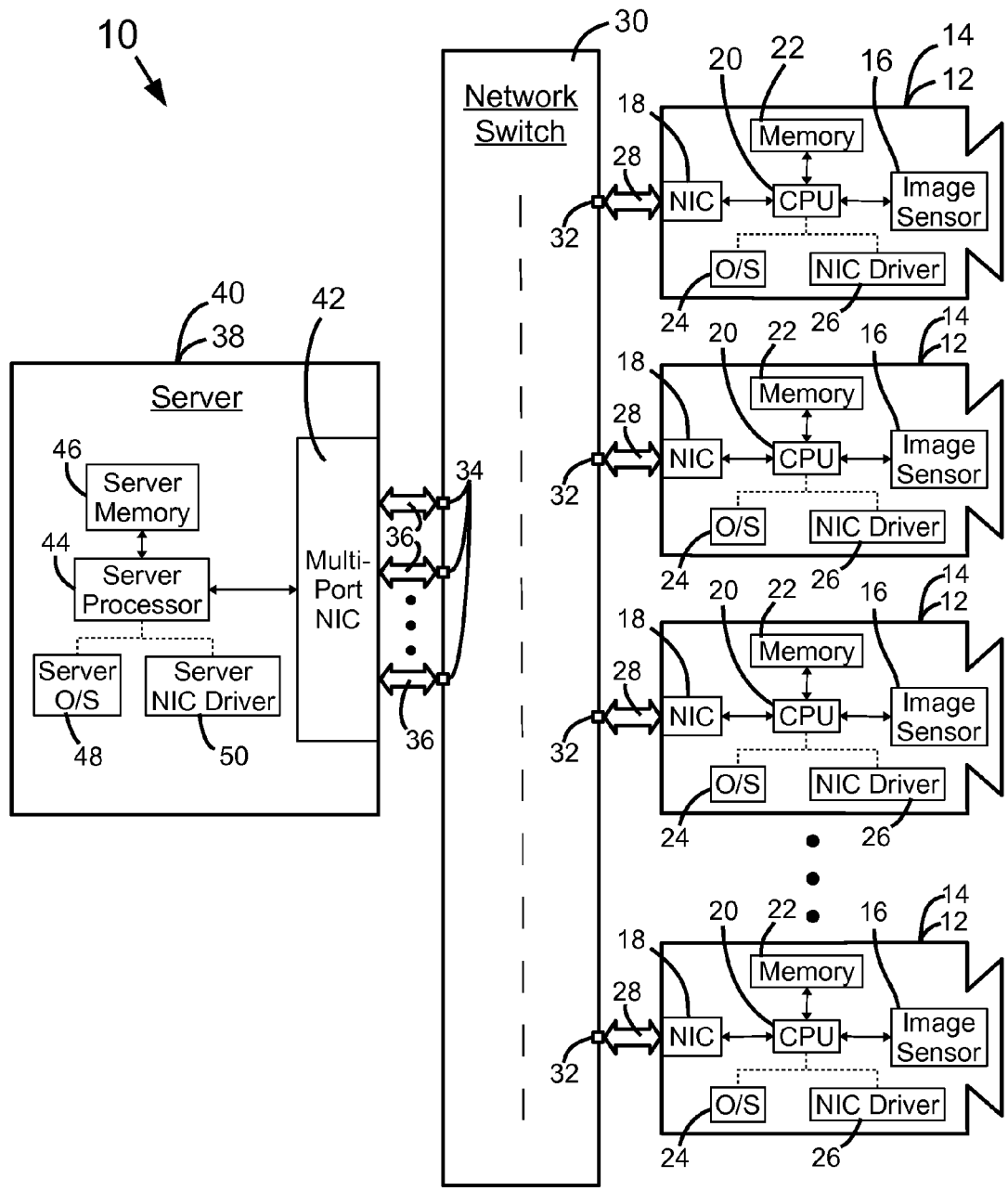
FIG. 1 is a block diagram of a system operable according to embodiments of the invention to transmit data by scalable link aggregation and to perform image analysis.

Referring to FIG. 1, the system is shown generally at 10. The system 10 according to a first and preferred embodiment of the invention is operable to transmit data by scalable link aggregation.

The system 10 includes one or more source devices 12, each of which may be any device operable to act as a source of a digital communication, including any imaging device such as the camera 14; any communications device such as a portable communications device, facsimile machine, telephone, including a land-line-connected or a wireless telephone such as a cellular or satellite telephone, radio, including a two-way radio, personal digital assistant, modem, or other equipment unit suitable for electronic communications; any computing device such as a general purpose computer, microcomputer, minicomputer, mainframe computer, distributed network for computing; any functionally equivalent discrete hardware components; and any combination thereof, for example.

FIG. 1 shows each source device 12 as having an image sensor 16 for capturing images, such as in the exemplary case where each source device 12 is a camera 14. The camera 14 is preferably a digital video camera, and the image sensor 16, the CPU 20 or both the image sensor 16 and the CPU 20 may be operable to produce digital representations of images being captured by the camera 14.

FIG. 1 also shows each source device 12 as having a Network Interface Card (NIC) 18 operable to provide a network interface for facilitating external communications of each source device 12. Although the exemplary NIC 18 is shown in FIG. 1 is illustrated as a single port NIC, it is within the scope contemplated by the present invention for any NIC 18 of the one or more source devices 12 to include multiple ports of any number and to have multiple-port capabilities. It is advantageously not necessary for the proper operation of the present invention to require the NIC 18 itself to have link aggregation capabilities.

Embedded within each source device 12 and shown in FIG. 1 between the image sensor 16 and the NIC 18 is a Central Processing Unit (CPU) 20 operable to control operations of the source device 12 separate from any operations internal to the NIC 18 itself.

In communication with the CPU 20 is a memory circuit 22 operable to store data and computer program instructions.

In various embodiments the CPU 20 may be implemented by any processing circuit having one or more circuit units, including a digital signal processor (DSP), embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The CPU 20 may include circuitry for storing memory, such as digital data, and may comprise the memory circuit 22 or be in wired communication with the memory circuit 22, for example.

Typically, the memory circuit 22 is all or part of a digital electronic integrated circuit or formed from a plurality of digital electronic integrated circuits. The memory circuit 22 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory circuit 22 may be operable to store memory as volatile memory, non-volatile memory, dynamic memory, etc. or any combination thereof.

Each source device 12 is preferably operable to run any one or more operating systems (O/S) 24, including real-time operating systems such as WinCE, Symbian, OSE and Embedded LINUX for example, non-real-time operating systems such as Linux, Windows and Unix for example, and any combination thereof.

Each source device 12 is preferably operable to execute operations in accordance with network interface driver software instructions such as the NIC driver 26 shown conceptually in FIG. 1. The NIC driver 26 is typically installed in the memory circuit 22 for execution by the CPU 20 in accordance with the manufacturer's instructions of the particular NIC 18 installed in the source device 12. The present invention is advantageously operable without restriction on the types of the NIC 18 and its associated NIC driver 26. The system 10 is advantageously operable to provide link aggregation without requiring the NIC 18 itself to have link aggregation capabilities.

As shown in FIG. 1, each source device 12 can be connected via a source connection 28 to a switching device such as the network switch 30. The network switch 30 is typically operable to receive, at any one of its one or more switching device input ports 32, communication data such as a network packet. As is well known in the art, a network packet contains header information specifying a destination address for the intended destination of the network packet. In ordinary operation, the network switch 30 receives a network packet at one of its switching device input ports 32, and then transmits the received network packet from the particular one of its one or more switching device output ports 34 that is connected to the intended destination via the controller connection 36.

The controller connection 36 is shown in FIG. 1 as being directly connected to a controller device 38, which in some embodiments may be implemented as a server 40 as shown in FIG. 1. The controller connection 36 is shown in FIG. 1 as being directly connected to the controller device 38 at its multi-port Network Interface Card (NIC) 42. Although FIG. 1 shows the exemplary implementation of the controller device 38 as one server 40, the controller device 38 may in various embodiments of the present invention be any device identical, similar, analogous to or different from the source device 12 and the system 10 may include one or more controller devices 38, for example. It is advantageously not necessary for the proper operation of the present invention to require the multi-port NIC 42 itself to have link aggregation capabilities. The system 10 is advantageously operable to provide link aggregation with or without the use of the switch 30 in any embodiments (not shown) in which one source device 12 having a multiple port network interface is connected via parallel network paths from its multiple ports to corresponding ports of a multiple port network interface of one controller device 38. While FIG. 1 shows a single switch 30 connected between the one or more source devices 12 and the controller device 38, in general any number of switching devices, networking components and/or connections may be used to provide a connection from one or more ports of the source NIC 18 to one or more ports of the NIC 42, provided preferably that each source device 12 and each controller device 38 are connected to the same subnetwork of a common communications network. The source connections 28 and the controller connections 36, and any portion thereof, may be any wired or wireless connection, including a copper wire link, a coaxial cable link, a fiber-optic transmission link, a radio link, a cellular telephone link, a satellite link, a line-of-sight free optical link, and any combination thereof, for example. The source connections 28 and the controller connections 36, and any portion thereof, form part or all of a communications network, such as the Internet for example. The transmission of network packets across the communications network may involve encrypted or otherwise secure communications.

The controller device 38 preferably includes a processing circuit, an example of which is shown in FIG. 1 as the server processor 44, and a memory circuit, an example of which is shown in FIG. 1 as the server memory 46.

The server processor 44 is typically a processing circuit that includes one or more circuit units, such as a central processing unit (CPU), digital signal processor (DSP), embedded processor, etc., and any combination thereof operating independently or in parallel, including possibly operating redundantly. The server processor 44 may be implemented in a manner identical, similar, analogous to or different from the CPU 20, for example. The server processor 44 may include circuitry for storing memory, such as digital data, and may comprise the server memory 46 or be in wired communication with the server memory 46, for example.

The server memory 46 is typically all or part of a digital electronic integrated circuit or formed from a plurality of digital electronic integrated circuits. The server memory 46 may be implemented and may be operable to store memory in a manner identical, similar, analogous to or different from the memory circuit 22. The server memory 46 preferably includes controller device 38 components, and in some embodiments may include a database (not shown) external to the controller device 38.

The controller device 38 is typically operable to run any one or more operating systems (O/S) identical, similar, analogous to or different from that or those of the source devices 12, including the exemplary server O/S 48 shown in FIG. 1. The controller device 38 may be operable to implement multi-tasking methods involving multiple threads of executable code, for example.

The controller device 38 is preferably operable to execute operations in accordance with network interface driver software instructions such as the server NIC driver 50 shown conceptually in FIG. 1. The server NIC driver 50 is typically installed in the server memory 46 for execution by the server processor 44 in accordance with the manufacturer's instructions of the particular NIC 42 installed in the controller device 38. The present invention is advantageously operable without restriction on the types of the NIC 42 and its associated NIC driver 50. The system 10 is advantageously operable to provide link aggregation without requiring the NIC 42 itself to have link aggregation capabilities.

Method of Scalable Link Aggregation

Figure 2:
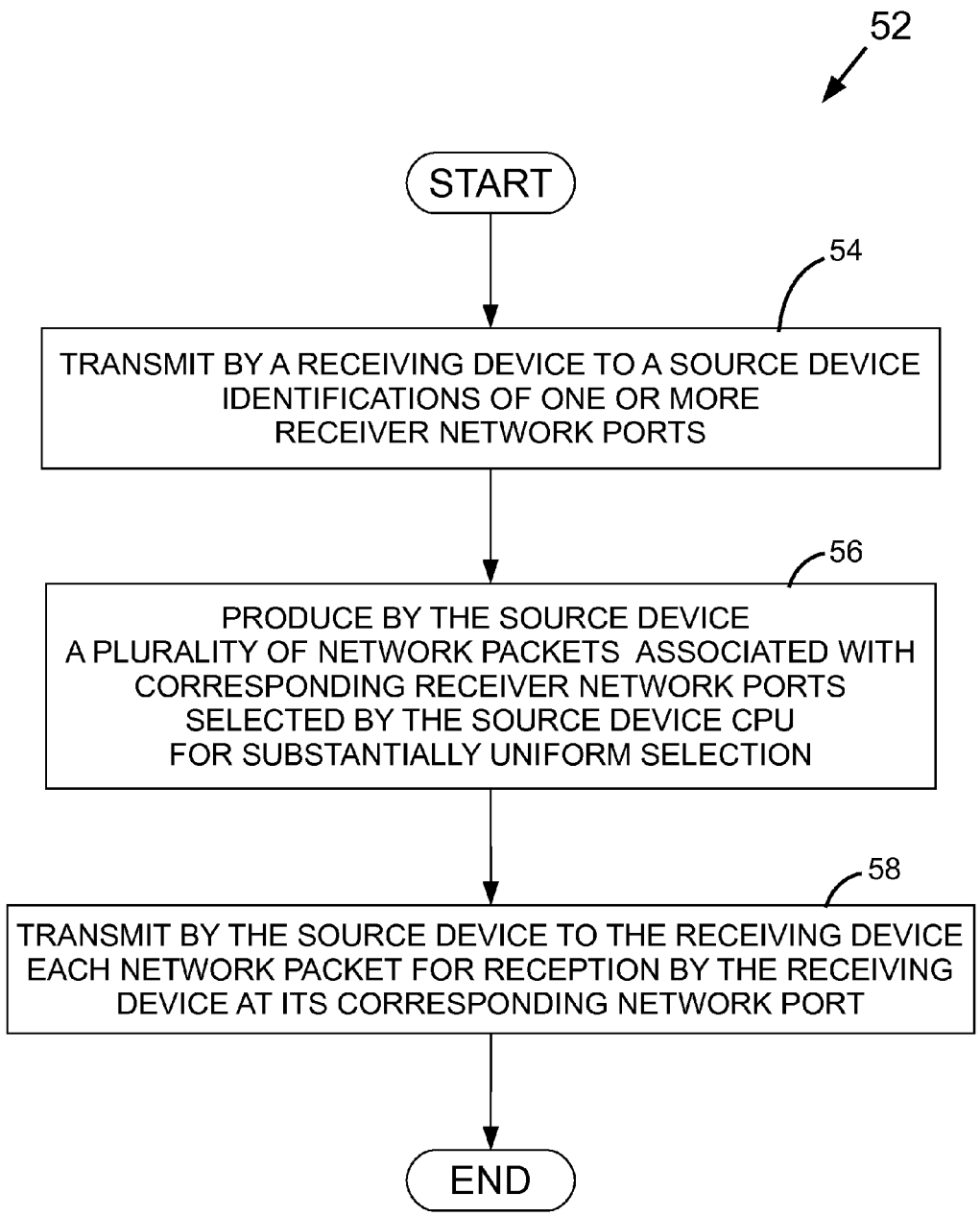
FIG. 2 is a flow diagram of a method of the system shown in FIG. 1 of transmitting data between a source device and a controller device by scalable link aggregation in accordance with a first embodiment of the invention.

Referring to FIG. 2, the memory circuit 22 in accordance with a first embodiment of the invention contains blocks of code comprising computer executable instructions for directing the CPU 20. Also, the server memory 46 in accordance with the first embodiment contains blocks of code comprising computer executable instructions for directing the server processor 44. Additionally or alternatively, such blocks of code may form part of one or more computer program products comprising computer executable instructions embodied in one or more signal bearing media, which may be one or more recordable computer-readable media or one or more signal transmission type media, for example.

When electrical power is being supplied to the CPU 20, the memory circuit 22, the server processor 44 and the server memory 46, the CPU 20 and the server processor 44 are directed in the first embodiment to perform respective steps of a method of the system 10 shown generally at 52.

Method 52 begins execution at block 54, which directs the server processor 44 to cause the controller device 38 to transmit to a source device 12 identifications of one or more controller network ports of the multi-port NIC 42.

Such transmission typically requires the establishment of communications between the controller device 38 and the source device 12 in accordance with any communications protocol or standard, as may be well known in the art. In various embodiments of the invention, the transmission of identifications of the one or more controller network ports of the multi-port NIC 42 may involve a single or multiple, including possibly redundant, communications between the controller device 38 and one or more of the source devices 12. In accordance with user settings of the controller device 38, all or only some of the network ports of the multi-port NIC 42 may be identified to the source devices 12 as a controller network port for use in communications between the source devices 12 and the controller device 38, although preferably a default condition of the controller device 38 is to identify at least all operational network ports of the controller device 38. Preferably, the transmitted identifications are made available to all of the source devices 12 connected to the same subnetwork of the communications network to which the controller device 38 is connected.

In general, the system 10 is operable to cause the server 40 to identify to the source device 12 any number of controller network ports that are operational within the controller device 38. Thus, the number of controller network ports available to the source device 12 in at least some embodiments is advantageously scalable in accordance with a user setting or otherwise under the control of the user, including being scalable by increasing the number of controller network ports present and operational within the controller device 38. Additionally or alternatively, the number of controller network ports available to the source device 12 may be all controller network ports that, upon startup of the controller device 38, are operational and associated with the same subnetwork of the communications network to which the source device 12 is connected. The number of controller network ports available to the source device 12 may be varied by physically changing the number of controller network ports during downtime of the controller device 38. In some embodiments, the controller device 38 is operable to transmit updated identifications to replace any existing identifications previously transmitted to the source device 12.

Thus, the number of controller network ports available to the source device 12 in the first embodiment is advantageously scalable in accordance with the number of controller network ports made physically operational and identified to a given source device 12.

In the exemplary circumstances in which at least one source device 12 has received a request or command transmitted from the controller device 38 to begin streaming data to the controller device 38, block 56 then directs the CPU 20 of that at least one source device 12 to cause that source device 12 to produce a plurality of network packets associated with corresponding controller network ports selected by that CPU 20 for substantially uniform selection.

The network packets may contain any data for transmitting to the controller device 38. For example, the network packets may contain data of a file transfer such as in circumstances of peer-to-peer networking, sensor data in circumstances of networked sensing equipment, image data in circumstances of networked imaging equipment such as the camera 14, etc. Additionally or alternatively, one or more network packets may include a representation of time at which an event may have occur, such as by including in a payload of the network packets time stamp information.

In the first embodiment, the CPU 20 is operable to select from among the controller network ports identified to the source device 12 by block 54. Such controller network ports may be selected in any fashion and are preferably selected for substantially uniform distribution of selections among the identified controller network ports. For example, the controller network ports may be selected according to a ranking system, randomly, in response to data representing historical use of controller network ports, by round robin selection in which the controller network ports are ordered from first to last (with the last being followed by the first) and each new selection is the subsequent controller network port in the round robin order, and any combination thereof.

It is within the scope of the present invention for the CPU 20 itself to produce the network packets, for the CPU 20 to cause the NIC 18 to produce the network packets, or any combination thereof including both the CPU 20 itself and the NIC 18 producing the same or different network packets. Preferably, the source device 12 is operable to associate the controller network port selected for a given network packet with that network packet in any manner, including having the CPU 20 produce header information of the network packet and/or having the CPU 20 communicate its selection to the NIC 18 for producing the header information of the network packet.

Block 58 directs the CPU 20 to cause the at least one source device 12 to transmit to the controller device 38 each network packet produced by the source device 12, for reception by the controller device 38 at its corresponding network port. In the first embodiment, the CPU 20 causes the NIC 18 to transmit the network packet such that the communications network, to which the source device 12 and the controller device 38 are connected, directs the network packet to the controller device 38 at its particular controller network port associated with the network packet. The communications network may include the switch 30 (FIG. 1), for example.

After block 58 has been executed, FIG. 2 shows that the method 52 ends. In various embodiments, the completion of blocks 54 to 58 may result in a return to an idle state of the system. Additionally or alternatively, any of blocks 54 to 58 may be re-executed, such as in exemplary circumstances of data streaming where one or more network packets produced by executing block 56 are transmitted by executing block 58 and then block 56 is re-executed to produce further network packets. Blocks 56 and 58 may be iteratively executed until no further data is available for transmission or no further data transmission is requested, for example.

Figure 3:
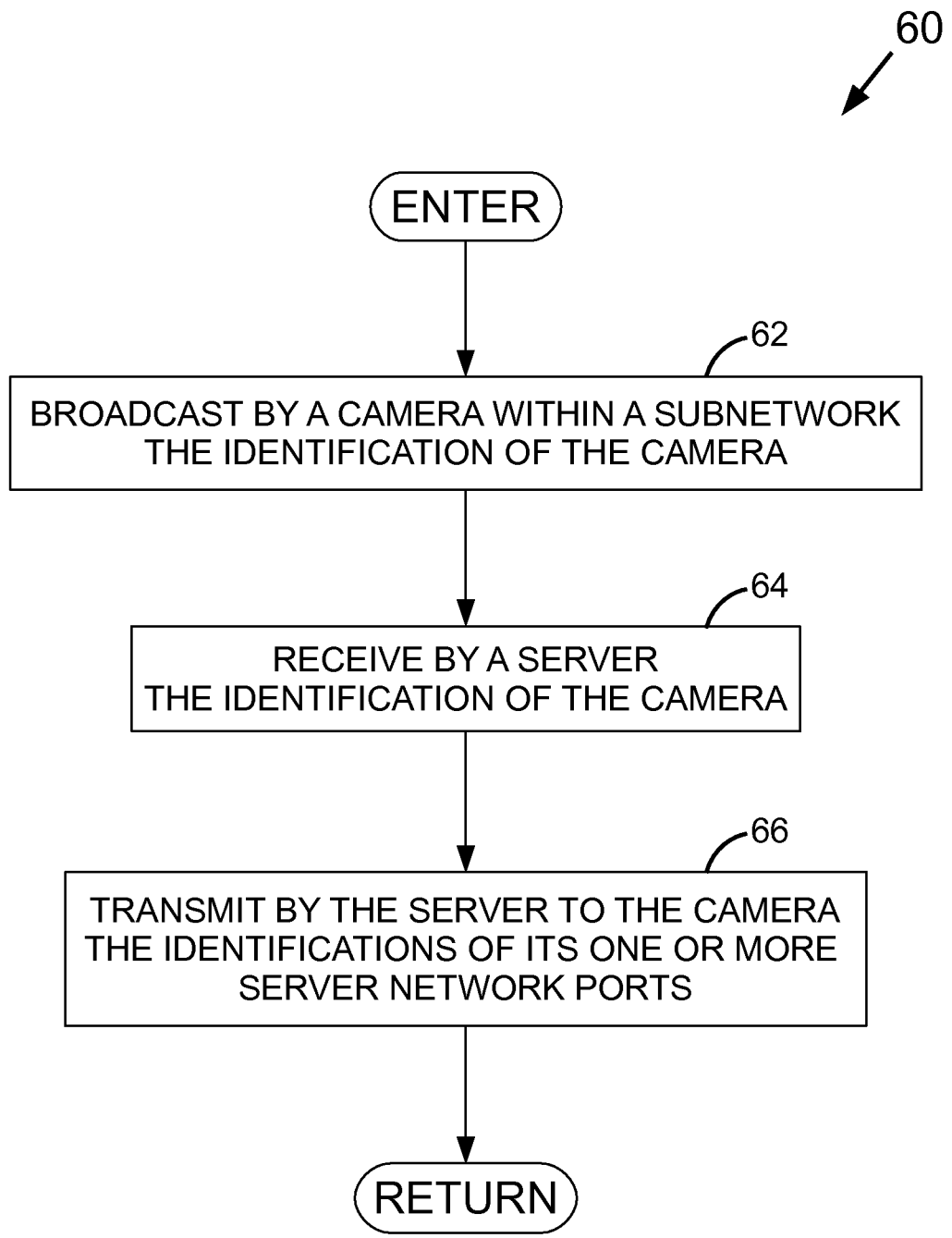
FIG. 3 is a flow diagram of an exemplary method of performing the step shown in FIG. 2 of transmitting identifications of one or more controller network ports, showing communications between a camera and a server.

Referring to FIG. 3, an exemplary method of performing steps of block 54 (FIG. 2) is shown generally at 60. In the exemplary circumstances in which a given source device 12 is the camera 14 and the controller device 38 is the server 40, method 60 begins execution at block 62, which directs the CPU 20 to cause the camera 14 to broadcast its presence and identification within a subnetwork. Preferably, the CPU 20 directs the NIC 18 to transmit a communication in accordance with any standard or protocol that can identify the camera 14. The camera 14 in the first embodiment is operable to broadcast transmit the communication such that the communication is available for reception by all devices connected to the same subnetwork of the communications network to which the camera 14 is connected, preferably including the server 40.

Block 64 directs the server processor 44 to cause the server 40 to receive the identification of the camera 14, such as by receiving at its multi-port NIC 42 the communication broadcast transmitted by the camera 14.

Block 66 directs the server processor 44 to cause the server 40 to transmit to the camera 14 the identifications of its one or more server network ports. Such server network ports are preferably those of the multi-port NIC 42 of the server 40 and may be any subset thereof. In some embodiments, transmitting the identifications of the server network ports to the camera 14 involves broadcast transmitting one or more communications containing the identifications for reception by all source devices 12 connected to the same subnetwork of the communications network to which the server 40 is connected. In some embodiments, however, the communication may be transmitted specifically to the particular camera 14 that had broadcast its identification by executing block 62. In some embodiments, the server 40 is operable to transmit updated identifications to replace any existing identifications previously transmitted to the camera 14.

After block 66 has been executed, the method 60 ends and operation control is returned to block 56 (FIG. 2).

Figure 4:
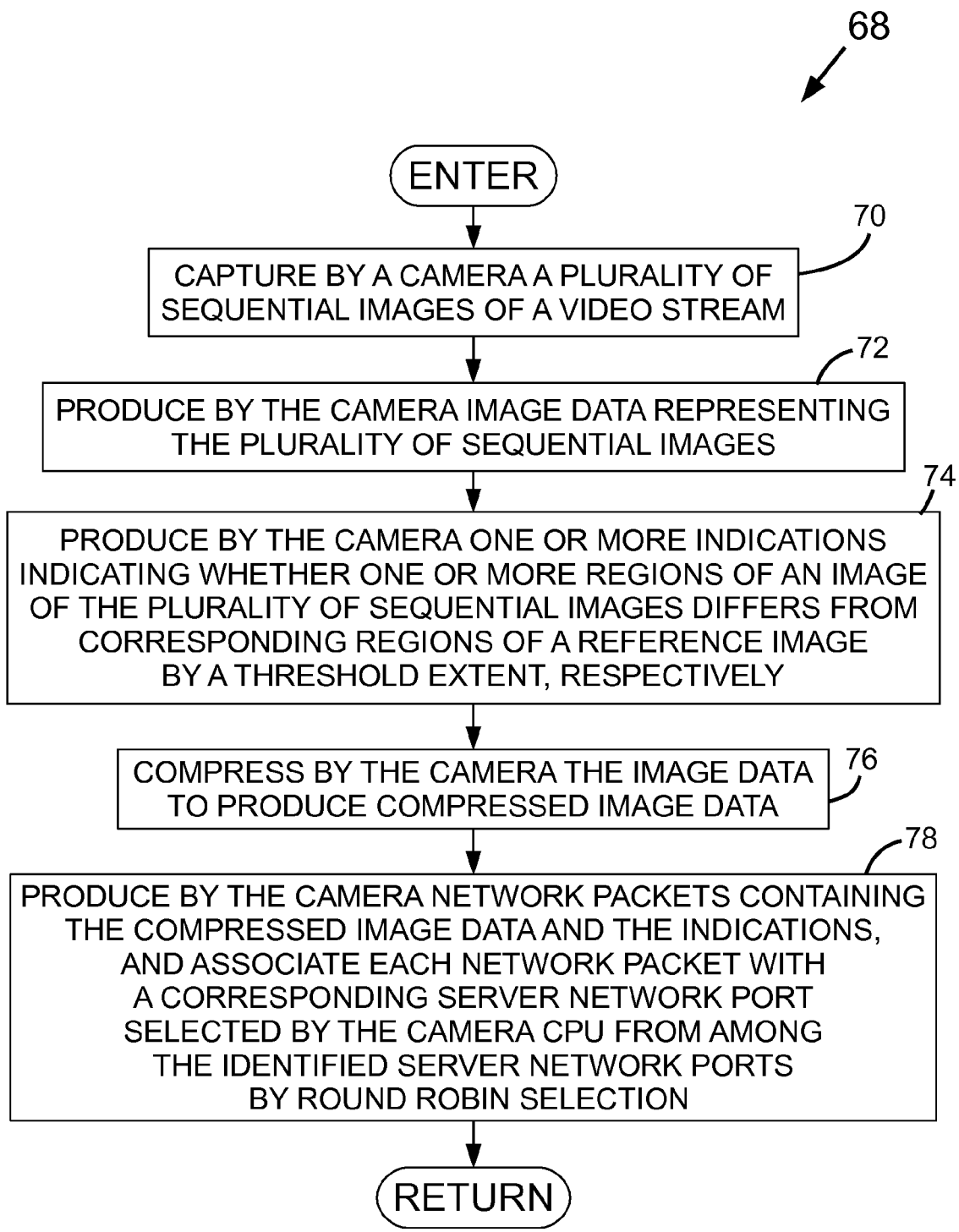
FIG. 4 is a flow diagram of an exemplary method of performing the step shown in FIG. 2 of producing a plurality of network packets associated with corresponding controller network ports selected by a source device Central Processing Unit (CPU) for substantially uniform selection.

Referring to FIG. 4, an exemplary method for directing the CPU 20 to perform steps of block 56 (FIG. 2) in respect of a given camera 14 is shown generally at 68. Method 68 begins execution at block 70, which directs the CPU 20 to cause the camera 14 to capture a plurality of sequential images of a video stream. The camera 14 is preferably operable to begin capturing images in response to a request received by the camera 14 from the server 40, by manual operation of the camera 14, or by both or either of such communicated request and such manual operation. In embodiments of the invention, images are captured by the image sensor 16 of the camera 14.

Block 72 directs the CPU 20 to cause the camera 14 to produce image data representing the plurality of sequential images. Preferably, the camera 14 is operable to produce image data for each image of the plurality of sequential images.

Preferably, the steps of blocks 70 and 72 are performed concurrently or simultaneously, such as by the image sensor 16 capturing and digitizing the plurality of sequential images to produce the image data. However, the scope of the present invention is not limited by any particular arrangement or operability of imaging and/or digitizing components within the camera 14. For example, the image sensor 16 may produce analog electronic signals that are subsequently digitized by other components such as an analog-to-digital converter (not shown) of the camera 14.

In the first embodiment, the camera 14 is operable to produce a digital video stream, which may be considered to comprise digital representations of the plurality of sequential images.

Block 74 directs the CPU 20 to cause the camera 14 to produce one or more indications indicating whether one or more regions of an image of the plurality of sequential images differs from corresponding regions of a reference image by a threshold extent, respectively. For the purposes of the disclosure herein, a given image and the reference image may be considered to form a pair of images in which the given image is the first image and the reference image is the second image. In the first embodiment, the first and second images are captured by the camera 14, and are captured at different times, including possibly one being immediately subsequent to the other, thereby rendering the first and second images consecutive. In the first embodiment, the second image is the image in the plurality of sequential images immediately preceding the first image. Additionally or alternatively, the system 10 in at least some embodiments is operable to form the second image from a multiple number of captured images by combining such captured images to form the reference image such that it is representative of a static background. In such embodiments, the system 10 is operable to create the reference image by extracting one or more static portions of images in a sequence of images representing an unchanging scene. The digital representations of the static portions are combined to form digital representations of a static background image indicative of a lack of motion.

In the exemplary embodiment described herein, in respect of each pair of images, the CPU 20 is operable to cause the camera 14 to define a number of regions of the first image, define the same number of regions of the second image corresponding to the regions of the first image, and to compare the regions of the first image with the corresponding regions of the second image. Preferably, the CPU 20 is operable for each pair to compare a given region of the first image and its corresponding region of the second image in accordance with a comparison formula to determine whether the region differs from its corresponding region by a threshold extent. In the various embodiments, the value of the threshold defining the threshold extent may be a fixed value determined during manufacturing of system 10 components, a fixed value determined during installation of system 10 components, a user configurable value, or any combination thereof including a user configurable value received from the controller device 38 for overriding, during operation of the camera 14, a manufacturing or installation default value, for example.

The comparison formula may involve any relational operations between digital representations of any image features. For example, the value of a data byte representing image data for a given region may be subtracted from the value of the data byte representing image data for the corresponding region, and the value of the absolute difference compared with the value of the threshold. In the first embodiment, each region and its corresponding region is compared to determine whether any differences therebetween are indicative of motion having occurred between the time the first image and the second image were captured. If the region and its corresponding region differ by an extent greater than the value of the threshold, thereby indicating motion has occurred, then the indication is assigned a particular value such as a positive value. For example, the indication may be represented digitally by one digital bit where a positive indication is represented by the bit value of '1' and a negative indication (indicating no detected motion or otherwise insufficient differences between the given region and its corresponding region) is represented by the bit value of '0', for example.

Block 76 directs the CPU 20 to cause the camera 14 to compress the image data to produce compressed image data representing the plurality of sequential images captured by the camera 14. In general, the CPU 20 may be directed to produce compressed data on the basis of the image data alone, on the basis of the indications, or on the basis of both the image data and the indications either compressed separately or together. Any suitable compression algorithm may be used, including lossy or lossless data compression, according to any suitable standard such as MPEG and others. In the first embodiment, the system 10 is advantageously operable to produce the indications on the basis of the uncompressed image data having no loss of information, while transmitting compressed image data to the controller device 38, thereby reducing the transmission bandwidth required for such transmission. However, it is within the scope contemplated by the present invention that the indications are produced on the basis of compressed image data or that uncompressed image data is transmitted, such as by link aggregation, to the controller device 38. Nonetheless, in the preferred embodiment where an indication is produced on the basis of uncompressed image data, block 76 may be executed before or after block 74, for example.

Block 78 directs the CPU 20 to cause the camera 14 to produce network packets containing the compressed image data and the one or more indications, and to associate each network packet with a corresponding server 40 network port selected, by the CPU 20 from among the identified server 40 network ports, by round robin selection. In the first embodiment, each network packet includes at least one data frame or payload containing at least a portion of the compressed image data, and includes a digital representation of a destination address for one server 40 network port. Preferably, an identification of the destination for a given network packet is contained within header or other control information of that network packet, such as by including in a header or trailer frame the digital representation of the server 40 network port, thereby associating the network packet with its corresponding server 40 network port destination. In some embodiments, the network packets may be datagrams. In various embodiments of the invention, the camera 14 is operable to produce network packets by the CPU 20 itself, by the NIC 18, by packet forming means (not shown) within or external to the camera 14, or any combination thereof for example.

In the first embodiment, the CPU 20 is directed by block 78 to select the server 40 network port for each network packet, thereby advantageously facilitating the link aggregation features of the system 10 while permitting the NIC 18 to be of any type, including any network interface not itself ordinarily capable of transmission by link aggregation. In various embodiments, the CPU 20 is then directed to produce network packets respectively containing therein identifications of the selected server 40 network packets. Additionally or alternatively, the CPU 20 is in some embodiments operable to communicate to the NIC 18 or other packet forming means (not shown) the selected server 40 network packet for each network packet to be produced by such packet forming means. In the first embodiment, the CPU 20 is directed to select the server 40 network packets by round robin selection.

As will be appreciated, the order of execution of blocks 70 to 78 may be varied from their exemplary illustration in FIG. 4. For example, it is within the scope contemplated by the present invention for the CPU 20 to cause the camera 14 to capture one sequential image in accordance with block 70, and process that one captured image in accordance with blocks 72 to 78 before capturing a further image in accordance with block 70. Additionally or alternatively, processing of each captured image may commence as soon as such image is captured in analog or digital format and may proceed concurrently with further executions of block 70 or with blocks 70 and 72. In the first embodiment, the executions of blocks 70 to 78 are streamed so as to produce a continuing video stream formatted as network packets respectively associated with corresponding server 40 network ports.

Still referring to the exemplary illustration of FIG. 4, after block 78 has been executed, the CPU 20 is directed to end the method 68 and return to the method 52 (FIG. 2) at block 58 thereof (FIG. 2).

Figure 5:
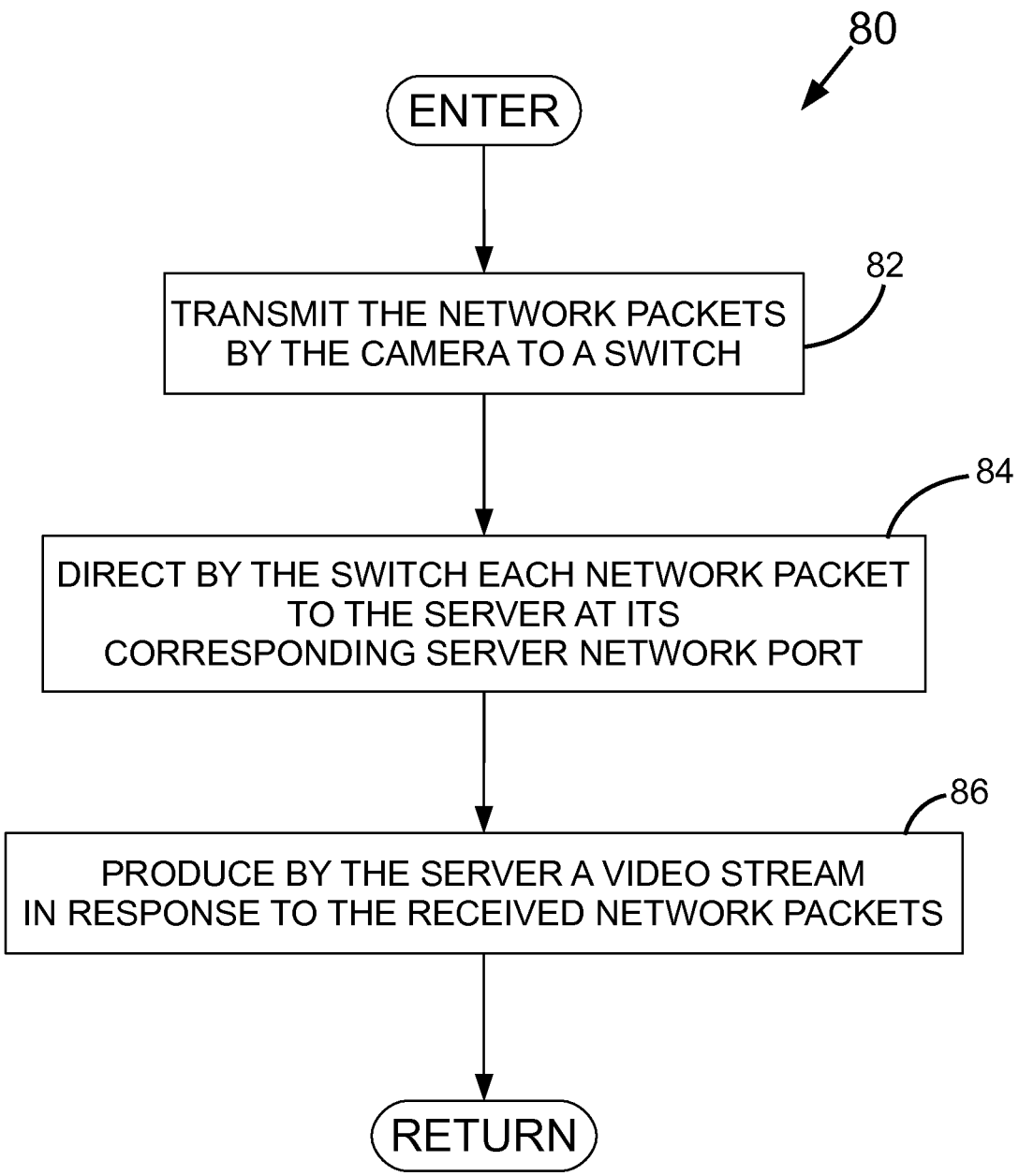
FIG. 5 is a flow diagram of an exemplary method of performing the step shown in FIG. 2 of transmitting each network packet for reception by the controller device at its corresponding network port, showing communications between the camera, a switch and the server.

Referring to FIG. 5, an exemplary method of the system 10 for performing steps of block 58 (FIG. 2) is shown generally at 80, which begins execution at block 82. The CPU 20 is directed by block 82 to cause the camera 14 to cause the camera 14 to transmit the network packets to the switch 30. As illustrated in FIG. 1, the network packets produced by each camera 14 are transmitted from their respective NICs 18 to a corresponding switching device input port 32 of the switch 30.

Block 84 directs the switch 30 of the system 10 to direct each network packet to the server 40 at its corresponding server 40 network port. In the first embodiment, each network packet contains a destination address identifying a server 40 network port corresponding to that network packet; and the switch 30 is operable to receive network packets at its switching device input ports 32, and direct each network packet to an appropriate switching device output port 34 such that each network packet is transmitted from the switch 30 to the server 40 at its server 40 network port defined in accordance with the destination address for each network packet.

Block 86 directs the server processor 44 to cause the server 40 to produce a video stream in response to the network packets received by the server 40. In the first embodiment, the server 40 is operable to recombine the network packets received from the various server 40 network ports of the multi-port NIC 42 into a single, chronologically ordered video stream. The system 10 is advantageously operable to produce the video stream at the server 40 without requiring the multi-port NIC 42 to itself have link aggregation capabilities. In various embodiments, block 86 is executed automatically upon receipt of the network packets, only upon user request, in accordance with a user setting, or any combination thereof for example. Additionally or alternatively, the server 40 may display the recombined video stream, request the re-transmission of specifiable network packets, or perform other server 40 processing tasks in response to the received network packets, including storing contents of one or more of the received network packets in the server memory 46.

Still referring to FIG. 5, after block 86 has been executed the server processor 44 is directed to end the method 80 and return to the method 52 (FIG. 2).

Referring back to FIG. 2, after block 58 has been executed the method 52 ends. In various embodiments, the system 10 is operable to end the method 52 upon having produced and transmitted a fixed number of network packets or a fixed quantity of image data, having produced and transmitted image data for a specifiable amount of time, having produced and transmitted image data for an indefinite amount of time until receiving a user command to cease, or any combination thereof for example. It is within the scope contemplated by the present invention for the system 10 to produce by the source device 12 one network packet and transmit that one network packet for reception by the controller device 38, then iteratively produce and transmit further network packets, for example. In the first embodiment, the system 10 is operable to stream the execution of blocks 56 and 58 such that a continuing video stream is produced and transmitted until a stop command is acted upon.

Thus, there is provided a method of transmitting data by scalable link aggregation from a source device having a central processing unit to a controller device, said source device and said controller device being connected to a communications network and associated with a subnetwork of said communications network, the method comprising: identifying by said controller device to said source device one or more network ports of said controller device; producing by said source device a plurality of network packets comprising said data, each said network packet being associated with a corresponding network port of said one or more network ports, said corresponding network port being selected by said central processing unit for substantially uniform selection of said one or more network ports; and transmitting said each network packet from said source device to said corresponding network port, respectively.

Method of Image Analysis

Referring back to FIG. 1, the system 10 according to a second and preferred embodiment of the invention is operable to analyze a plurality of images.

In accordance with the second embodiment, the memory circuit 22 and the server memory 46 contain blocks of code comprising computer executable instructions for directing the CPU 20 and the server processor 44, respectively. Additionally or alternatively, such blocks of code may form part of one or more computer program products comprising computer executable instructions embodied in one or more signal bearing media, which may be one or more recordable computer-readable media or one or more signal transmission type media for example, in accordance with the second embodiment.

Figure 6:
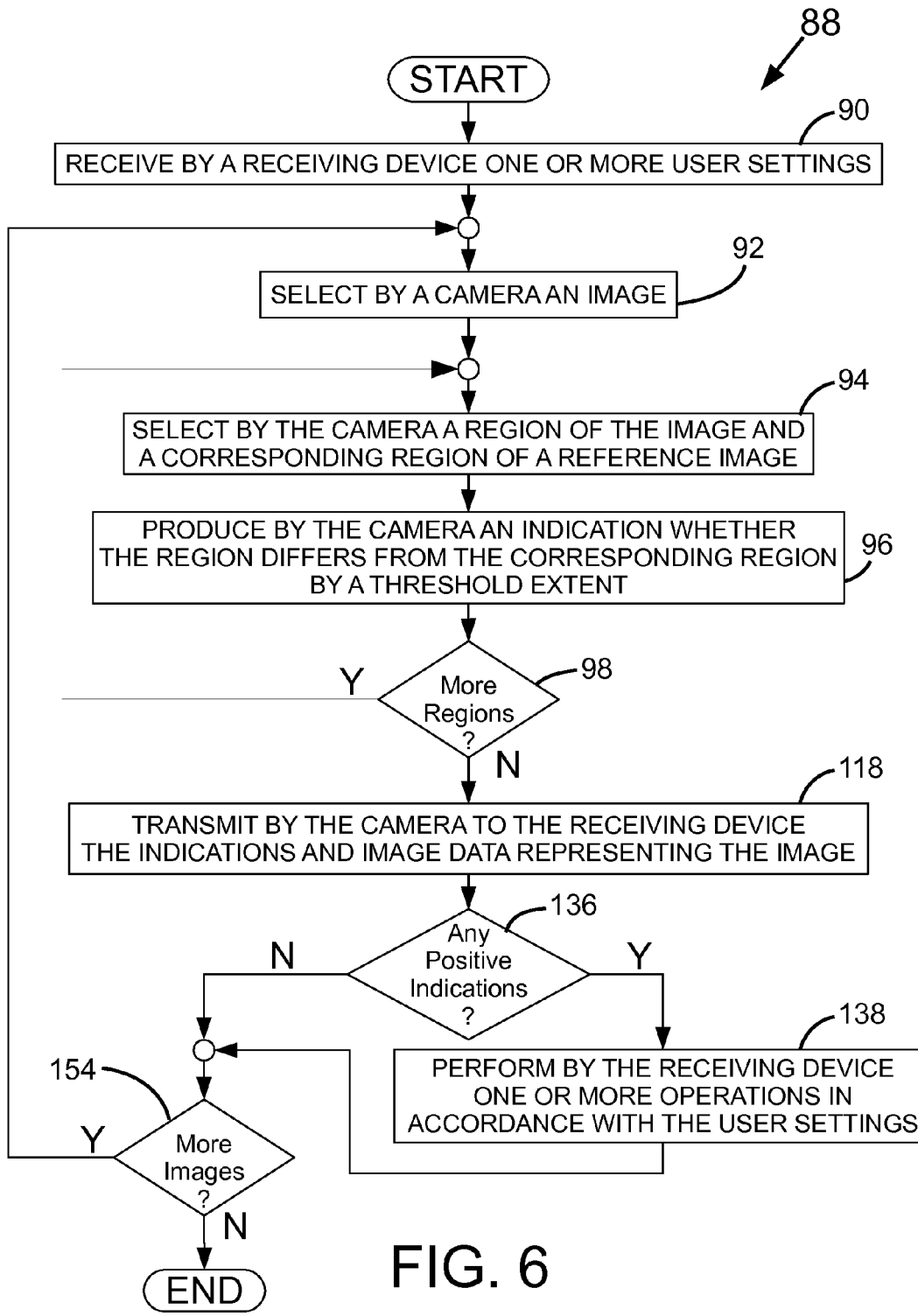
FIG. 6 is a flow diagram of a method of the system shown in FIG. 1 of analyzing a plurality of images according to a second embodiment of the invention.

When electrical power is being supplied to the CPU 20, the memory circuit 22, the server processor 44 and the server memory 46, the CPU 20 and the server processor 44 are directed in the second embodiment to perform respective steps of a method of the system 10 shown generally in FIG. 6 at 88.

Referring to FIG. 6, the method 88 is illustrative of exemplary, non-limiting embodiments of the invention in which at least one source device 12 is a camera 14.

The method 88 begins when the server processor 44 is directed to begin executing instructions of block 90, which directs the server processor 44 to cause the controller device 38 to receive one or more user settings. Such user settings may include any configuration or operational parameters, default values, specific values for overriding default values, or any combination thereof. In the second embodiment, the controller device 38 is operable to receive user settings as user input during installation, configuration, operation, or any combination thereof, of the controller device 38 for example.

Block 92 then directs the CPU 20 of the camera 14 to select an image. In general, such image may have been obtained by any means including having been captured by an image sensor 16 of the camera 14. For the purposes of the disclosure herein, the selected image may be considered the first image of a pair of images in which the second image of the pair is a reference image. Preferably, each subsequent iteration of block 92 involves selecting as the first image a subsequently captured image of a plurality of images sequentially captured by the camera 14.

Selecting the first image may also include selecting the second image. Preferably, the first and second images are captured at different times, including possibly one being immediately subsequent to the other, thereby rendering the first and second images consecutive. In some embodiments, the reference image is a static background image indicative of a lack of motion. In general, the second image may be selected at any time prior to executing block 94 (described below).

Block 94 directs the CPU 20 to cause the camera 14 to select a region of the first image and a corresponding region of the reference image. In the second embodiment, each region is a section of an image, and a given region and its corresponding region are selected in respect of corresponding sections of their respective images. Executing block 94 may also involve selecting reference image data representing the reference image. In the second embodiment, the camera 14 is operable to select the reference image as the image of the plurality of images that immediately precedes the first image. In some embodiments, the reference image is selected as a static background image.

Block 96 directs the CPU 20 to cause the camera 14 to produce an indication whether the region (selected by block 94) differs from the corresponding region by a threshold extent. In various embodiments, the camera 14 is operable to determine whether the region differs from the corresponding region in any suitable manner, including but not limited to making such determination in accordance with a comparison formula. In the second embodiment, the camera 14 is operable to determine whether any differences between the region and the corresponding are indicative of motion having occurred within the section of the captured images associated with region and corresponding region, and to produce a positive indication if motion is detected.

Blocks 94 and 96 may be implemented in any manner identical, similar, analogous or different from that of block 74 (FIG. 4), for example.

Block 98 directs the CPU 20 to determine whether there are more regions of the first image to be compared with corresponding regions of the second image.

If the CPU 20 determines by block 98 that there are more regions, then the CPU 20 is directed to execute block 94 again. In the second embodiment, blocks 94 to 98 are executed until indications have been produced for all defined regions and corresponding regions of the first and second images.

Figure 7:
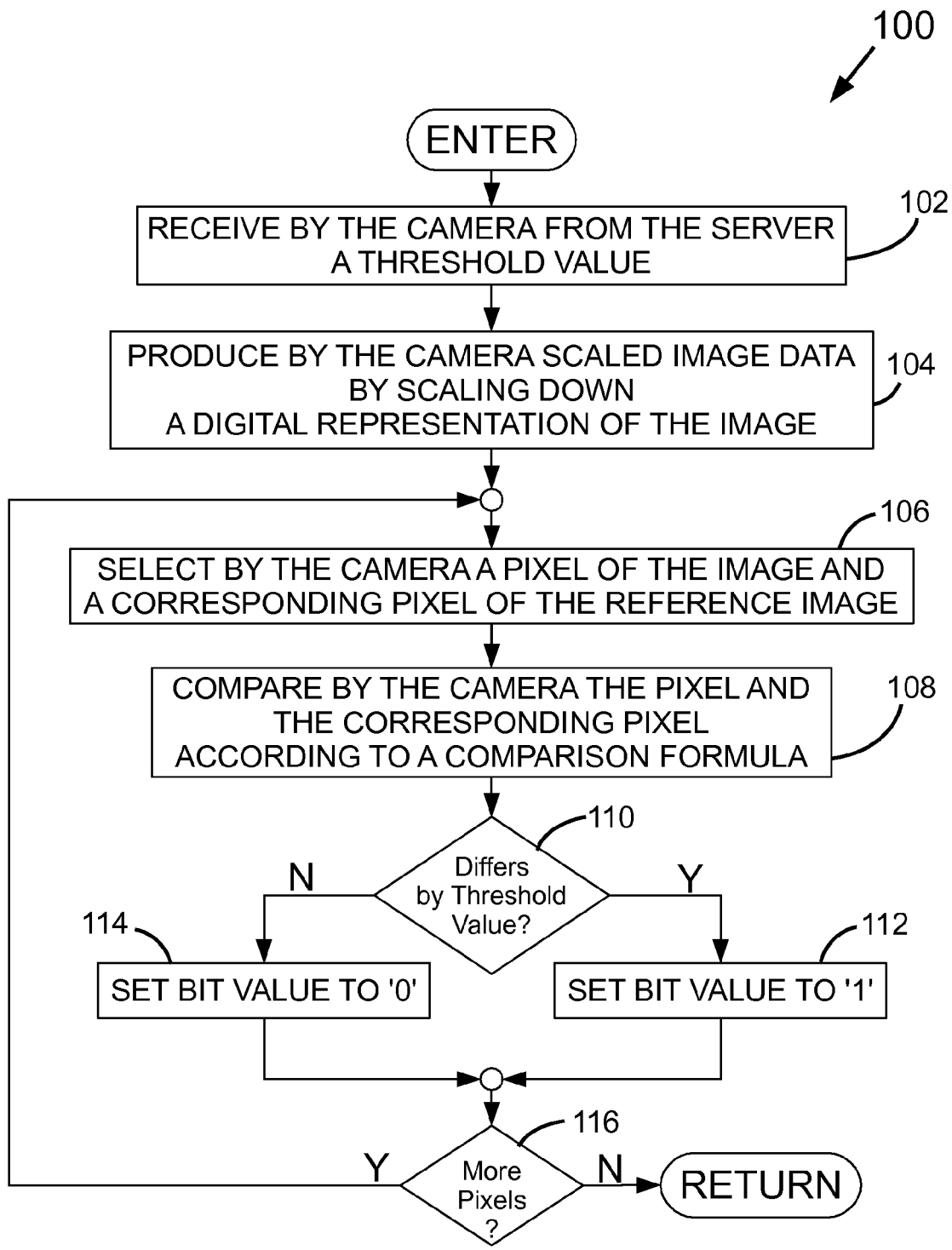
FIG. 7 is a flow diagram of an exemplary method of performing the steps shown in FIG. 6 of selecting regions and producing indications whether each region differs from a corresponding region by a threshold extent, showing a selected pixel of an image being compared with a corresponding pixel of a reference image.

Referring to FIG. 7, an exemplary method for directing the CPU 20 to perform steps of blocks 94 to 98 (FIG. 6) is shown generally at 100. In the exemplary circumstances in which the controller device 38 is the server 40, method 100 begins execution at block 102, which directs the CPU 20 to cause the camera 14 to receive from the server 40 a threshold value. While shown in FIG. 7 as the first block of the method 100, it is also within the scope contemplated by the present invention for the camera 14 to receive such threshold value at any time prior to its use during execution of the method 100, such as during initialization of the camera 14 for example. Additionally or alternatively, the camera 14 is operable in some embodiments to determine, such as by receiving from the server 40, an updated threshold value to replace any existing threshold value previously obtained.

Block 104 directs the CPU 20 to cause the camera 14 to produce scaled image data by scaling down a digital representation of the image. For the purposes of the disclosure herein, the image may be considered the first image of a pair of images in which the second image is a reference image. Scaling down the digital representation of the first image may be performed by any suitable method, such as by averaging image data corresponding to each defined section of the first image. In the second embodiment, the camera 14 is operable to define sections of a given image, such as sections of 16 pixels by 16 pixels each; to determine digital representations representing each section; to compute an average for each section; to represent each average as a digital representation of a single pixel associated with each respective section; and to collate the averaged pixels to form scaled image data. In exemplary embodiments where one pixel is determined for each section of 16 by 16 pixels of the original image data, the scaled image data is scaled down from the original image data by a factor of 256, that number being the product of 16 and 16.

Block 106 directs the CPU 20 to cause the camera 14 to select a pixel of the first image and a corresponding pixel of the reference image. Preferably, the CPU 20 selects a pixel of the scaled image data representing the first image and correspondingly scaled reference image data representing the reference image, although selecting a pixel or other region of original, unscaled image data is within the scope of the present invention.

Block 108 directs the CPU 20 to cause the camera 14 to compare the pixel (selected by executing block 106) and the corresponding pixel in accordance with a comparison formula. While the comparison formula may involve any relational operations between digital representations of any image features, the comparison formula in the second embodiment involves a subtraction of the pixel and the corresponding pixel to obtain a difference value indicative of whether motion has occurred within the section represented by the pixel and the corresponding pixel between the time the first and second images were obtained.

Block 110 determines whether any differences determined by block 108 between the pixel and the corresponding pixel are beyond the threshold value obtained by block 102. Block 110 may be executed by comparing the difference value of block 108 with the threshold value, thereby resulting in a determination as to whether the difference value is greater than, equal to, or less than the threshold value.

If by executing block 110 the CPU 20 determines that the pixel and the corresponding pixel differ by the threshold value, such as by the difference value being equal to or greater than the threshold value, then the CPU 20 is directed to execute block 112.

Block 112 directs the CPU 20 to set a bit value to '1', such as by setting the bit value of an indication associated with the pixel and corresponding pixel of the scaled image data, to indicate a positive indication.

If by block 110 the CPU 20 determines that the pixel and the corresponding pixel do not differ by the threshold value, such as by the difference value being less than (or in variations of the embodiments, equal to or less than) the threshold value, then the CPU 20 is directed to execute block 114.

Block 114 directs the CPU 20 to set a bit value to '0', such as by setting the bit value of the indication associated with the pixel and corresponding pixel of the scaled image data, to indicate a negative indication.

In exemplary embodiments where the original images are scaled down by a factor of 256, each pixel is represented digitally by one 8-bit byte and each indication constitutes one bit, the indications constitute 2048 times less digital data than the original images.

Block 116 directs the CPU 20 to determine whether there are more pixels of the first and second images available for analysis. If more pixels are available, the CPU 20 is directed to re-execute blocks 106 to 114 such that a new indication in respect of a new pixel and a new corresponding pixel is determined.

If by block 116 the CPU 20 determines that there are no more pixels associated with the first and second images for performing image analysis, then the CPU 20 is directed to end the method 100 and operation control is returned to block 118 of FIG. 6.

Referring back to FIG. 6, if the CPU 20 determines that there are no more regions, including by having determined by block 116 (FIG. 7) that there are no more pixels, the CPU 20 is directed to execute block 118 shown in FIG. 6.

Block 118 directs the CPU 20 to cause the camera 14 to transmit to the controller device 38 the indications and the image data representing the first image. Block 118 may be implemented in any manner identical, similar, analogous or different from that of block 58 of FIG. 2, for example. In at least some embodiments, the system 10 is operable to transmit the indications and the image data by scalable link aggregation, for example.

Figure 8:
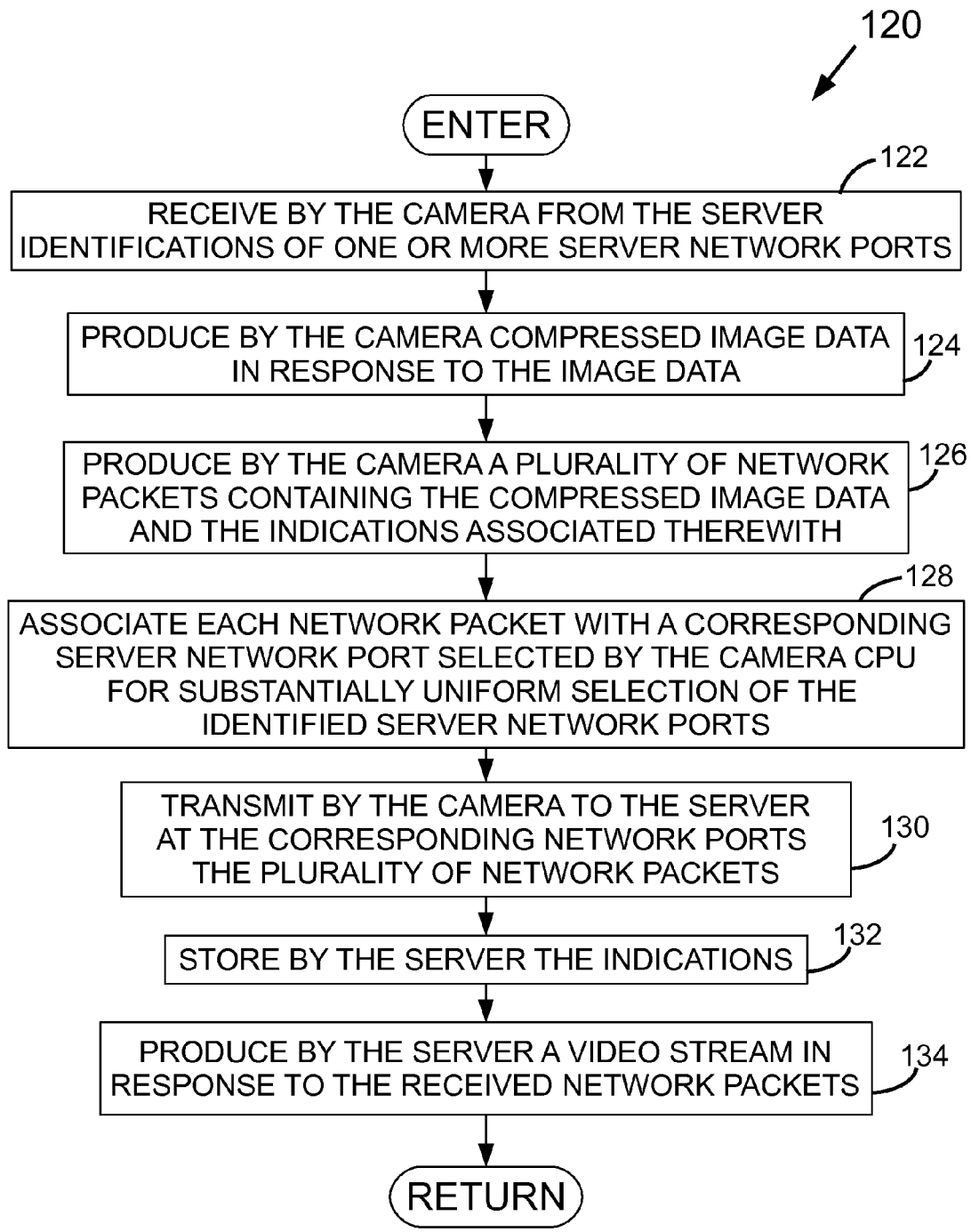
FIG. 8 is a flow diagram of an exemplary method of performing the step shown in FIG. 6 of transmitting indications and image data, showing each network packet being associated with a corresponding server network port selected by the camera CPU for substantially uniform selection.

Referring to FIG. 8, an exemplary method for directing the CPU 20 to perform steps of block 118 (FIG. 6) is shown generally at 120. The method 120 begins execution at block 122, which directs the CPU 20 to cause the camera 14 to receive from the server 40 identifications of one or more server 40 network ports. While shown in FIG. 8 as the first block of the method 120, it is also within the scope contemplated by the present invention for block 122 to be executed at any time prior to executing block 128 (described below), such as during initialization of the camera 14 for example. In some embodiments, the camera 14 is operable to determine, such as by receiving from the server 40, updated identifications of server 40 network ports to replace any existing identifications previously obtained.

Block 124 directs the CPU 20 to cause the camera 14 to produce compressed image data in response to the image data selected by block 92 (FIG. 6). Block 124 may be implemented in any manner identical, similar, analogous or different from that of block 76 (FIG. 4), for example.

Block 126 directs the CPU 20 to cause the camera 14 to produce a plurality of network packets containing the compressed image data and the indications associated with the compressed image data. Such indications are preferably those produced by executing block 96 (FIG. 6), including possibly in accordance with the method 100 (FIG. 7). The compressed image data is preferably that produced by executing block 124. It is not necessary for the proper operation of the present invention for each network packet to include both image data and one or more indications. Preferably, however, each indication, or digital representation thereof, is associated with the region and corresponding region from which the indication was produced.

Block 128 directs the CPU 20 to cause the camera 14 to associate each network packet with a corresponding server 40 network port selected by the CPU 20 for substantially uniform selection of the server 40 network ports identified by executing block 122. Block 128 may be implemented in any manner identical, similar, analogous or different from that of block 78 (FIG. 4), for example.

Block 130 directs the CPU 20 to cause the camera 14 to transmit the plurality of network packets produced by block 126 to the server 40 at the corresponding server 40 network ports selected by executing block 128. In the second embodiment, the camera 14 is operable to transmit the plurality of network packets in any suitable manner and via any networking means having any intermediate connection(s) or device(s), including but not limited to transmitting the network packets via the switch 30 shown in FIG. 1. Block 130 may be implemented in any manner identical, similar, analogous or different from that of block 58 (FIG. 2), for example.

Block 132 directs the server processor 44 to cause the server 40 to store the indications contained within the network packets received by the server 40 from the camera 14. Preferably, the indications are stored such that an association is maintained between the indications and the compressed image data received by the server 40, whereby each indication is associated with a portion of the compressed image data representing the region from which each indication was produced, respectively. The indications are preferably stored in the server memory 46, including possibly stored in a database external to the server 40.

Block 134 directs the server processor 40 to cause the server 40 to produce a video stream in response to the received network packets. Block 134 may be implemented in any manner identical, similar, analogous or different from that of block 86 (FIG. 5), for example. In the second embodiment, producing a video stream includes storing image data contents of one or more of the received network packets in the server memory 46, including possibly storing image data in a database external to the server 40.

After block 134 is executed, the method 120 ends and operation control is returned to the method 88 (FIG. 6) at block 136.

Referring back to FIG. 6, block 136 directs the server processor 44 to cause the controller device 38 to determine whether there are any positive indications among the indications received from the camera 14.

If there is at least one positive indication, block 138 directs the server processor 44 to cause the controller device 38 to perform one or more operations in accordance with the user settings (previously obtained by executing block 90).

The system 10 is advantageously operable to perform operations on the basis of the indications, including positive indications, produced in response to uncompressed image data without requiring uncompressed image data to be transmitted from a given source device 12 to the controller device 38 and without requiring the given source device 12 itself perform such operations.

Figure 9:
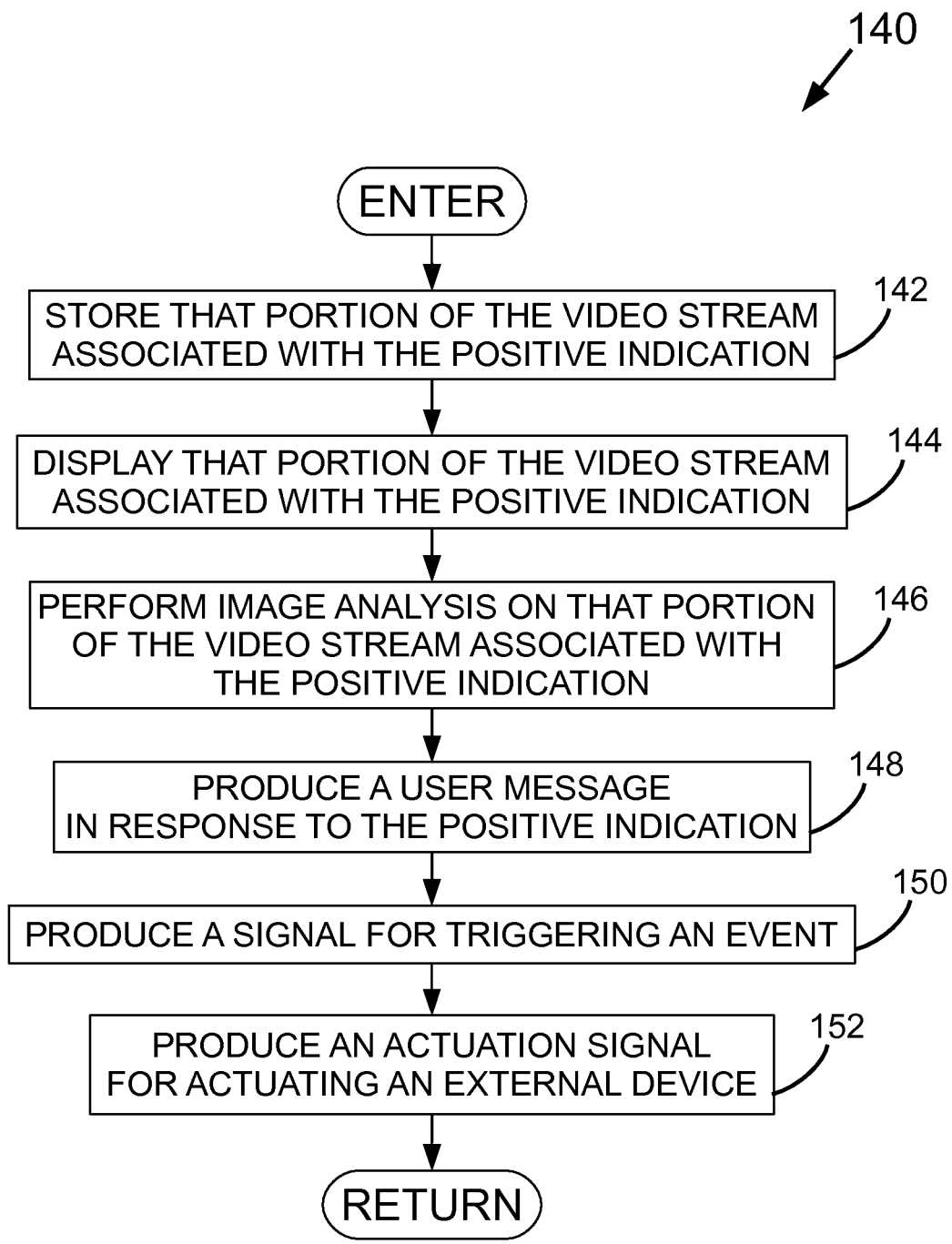
FIG. 9 is a flow diagram of an exemplary method of performing the step shown in FIG. 6 of performing operations according to user settings, showing performing image analysis on a portion of the image data associated with a positive indication.

Referring to FIG. 9, an exemplary method for directing the server processor 44 to perform steps of block 138 (FIG. 6) is shown generally at 140. The method 140 begins execution at block 142, which directs the server processor 44 to cause the server 40 to store that portion of the video stream associated with each positive indication determined by block 136 (FIG. 6). Preferably, the video stream is that produced by executing block 134 (FIG. 8) and the portion is stored in the server memory 46. Preferably, each stored portion is stored so as to maintain its association with each associated positive indication.

Block 144 directs the server processor 44 to cause the system 10 to display at least that portion of the video stream associated with each positive indication determined by block 136 (FIG. 6). In the second embodiment, the system 10 is operable to display portions or all of the video stream on a user display (not shown), including displaying multiple portions simultaneously.

Block 146 directs the server processor 44 to perform further image analysis on at least that portion of the video stream associated with each positive indication determined by block 136 (FIG. 6). In various embodiments, such further image analysis may include object identification, object comparison, background elimination, other image analysis operations and any combination thereof, for example.

Block 148 directs the server processor 44 to produce a user message in response to each positive indication. For example, the system 10 is operable in the second embodiment to provide a user with an alert message for each or for selected instances of indicated motion.

Block 150 directs the server processor 44 to cause the server 40 to produce a signal for triggering an event. In various embodiments, the server 40 is operable to communicate such signal such that components of the system 10 (not necessarily shown) or other systems are operable to trigger an event. Such events may include any automated response, including a security response.

Block 152 directs the server processor 44 to cause the server 40 to produce an actuation signal for actuating an external device. For example, the server 40 in at least some embodiments is operable to produce an actuation signal for opening an access door when motion is detected near the access door. Blocks 146 and 152 may be combined in some embodiments such that motion by a person identified as having authorized access may result in access being actuated by the system 10 in accordance with the present invention.

While FIG. 9 shows all of blocks 142 to 152 in a specific order, blocks 142 to 152 may be performed in any order in response to the user settings received by executing block 90 (FIG. 6). Any, all or none of blocks 142 to 152 may be executed in any order in response to the user settings at a given point in time or processing.

After the appropriate blocks of FIG. 9 are executed in accordance with the user settings, the method 140 ends and operation control is returned to the method 88 (FIG. 6) at block 154.

Referring back to FIG. 6, if by executing block 136 the server processor 44 determines that there are no positive indications, or after block 138 is executed, the method 88 proceeds to block 154.

Block 154 directs the appropriate processing unit of the system 10 to determine whether there are more images available for analysis. In the second embodiment, the server processor 44 is operable to receive as user input a request to cease image analysis of the method 88 in respect of a given camera 14. In response to such request, the server processor 44 is operable to cease processing newly received network packet frames of image data and indications and to transmit a corresponding request to the given camera 14 to cease obtaining images; and the CPU 20 of the given camera 14 is operable to receive such corresponding request, to cease selecting a subsequent first image for image analysis, and to cease capturing images of the plurality of sequential images. Additionally or alternatively, the camera 14 may be operable to cease operation in response to user input received at the camera 14 by the CPU 20 directly from the user, for example. In some embodiments, the controller device 38 is operable to transmit to a given camera 14 a request to cease obtaining further images, such that only any remaining images are processed after which the camera 14 transmits a communication to the controller device 38 indicating no further images are available for analysis. Other arrangements for determining whether there are more images available for analysis are possible.

If by block 154 the system 10 determines that there are more images for analysis, the CPU 20 of the camera 14 is directed to execute blocks 92 to 138 again. In embodiments where the reference image is selected as a static background image, the same static background image may be selected and employed by the camera 14 multiple times for different executions of blocks 92 to 138, for example.

If by block 154 the system 10 determines that there are no more images available for analysis, the system 10 is directed to end the method 88.

Thus, there is provided a method of analyzing a plurality of images captured by a camera, the method comprising: (a) producing by said camera an indication whether a region of an image of said plurality of images differs from a corresponding region of a reference image by a threshold extent; (b) transmitting by said camera via a communications network to a controller device said indication and image data representing said image; and (c) storing by said controller device said image data and said indication in association therewith.

System for Streaming a Video

A system for streaming a video, the video comprising a plurality of image frames having associated therewith a source frame rate, each said image frame having associated therewith a source pixel resolution, each said image frame comprising a plurality of data packets, includes: (a) receiving means for receiving as user input a viewing area of a viewing window, an image region, and a display quality bias; and (b) transmitting means for transmitting a selection of said image frames and, for each said selected image frame, transmitting a data packet selection of said data packets associated only with said image region and a pixel resolution determined in response to said viewing area, said display quality bias and said source pixel resolution. The receiving means may be operable to receive as user input a chromatic specification selected from the group consisting of a monochromatic selection and a colour selection. The transmitting means may be operable to transmit monochrome information only of the video stream when said chromatic specification is selected as said monochrome selection. The system may include data packet selecting means for selecting said data packet selection. The system may include frame selecting means for selecting said selected image frames.

Figure 10:
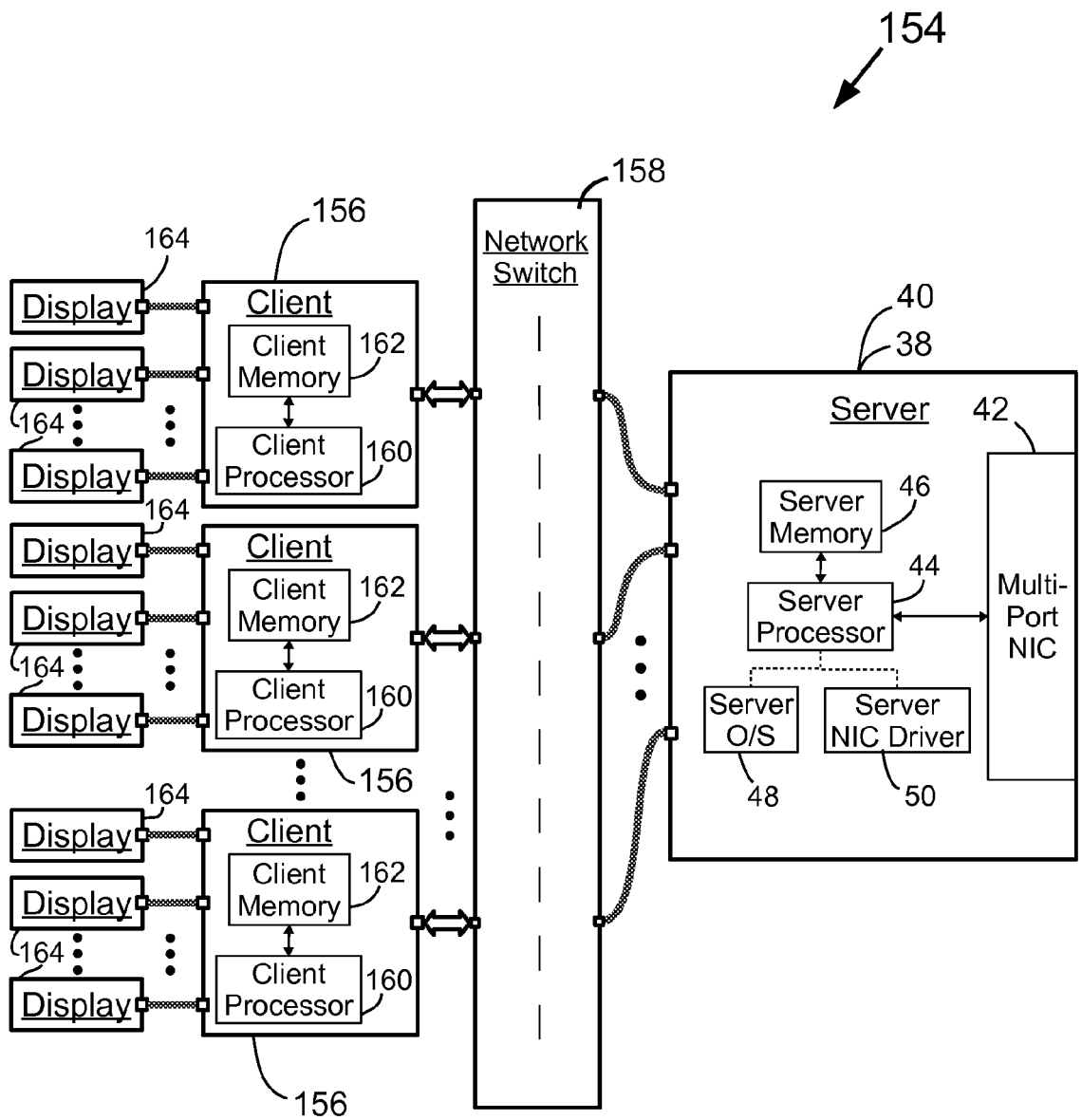
FIG. 10 is a block diagram of a system operable according to a third embodiment of the invention to stream a video.

Referring to FIG. 10, the video streaming system is shown generally at 154. The video streaming system 154 according to a third embodiment of the invention is operable to transmit selected data packets of selected image frames of the video stream from the controller device 38, which in the third embodiment is implemented as the server 40, to one or more clients 156. In the third embodiment, the selected data packets are transmitted by the server 40 to one or more clients 156 via a network switch 158. The server 40 is operable to obtain the video stream by receiving the video stream from one or more source devices 12, such as the cameras 14 (FIG. 1). Additionally or alternatively, the server 40 is operable in at least some embodiments to transmit selected data packets retrieved from the server memory 46.

In the third embodiment, the video stream contains any number of image frames originally generated at a source frame rate, in frames per second, dependent on the particular originating source of the video stream. For example, a given camera 14 may be operable to produce a video stream at 30 frames per second, while a different camera 14 may be operable to produce its video stream at the same or a different frame rate. In the third embodiment, the server 40 is operable to determine the frame rate of a video stream being received from a given camera 14, such as by receiving the frame rate in a communication from the given camera 14. Additionally or alternatively, the server 40 may be operable to determine a frame rate for a given video stream by analysis of one or more data packets forming the video stream.

In the third embodiment, each image frame of a given video stream is represented by any number of data packets, which typically provide pixel by pixel information for the image frame. Typically, a pixel resolution represents the number of pixels for which such pixel by pixel information is provided. For example, a given image frame may contain data packets providing information respecting 307,200 pixels, or approximately 0.3 Megapixels, arranged as 480 rows of pixels, with each row having a width of 640 pixels. A source pixel resolution may represent the pixel resolution of a given video stream as it is generated by a given source, such as the camera 14, or retrieved from a given source, such as being retrieved from the server memory 46, for example.

The network switch 158 may be implemented or otherwise function in a manner identical, similar, analogous or different to that of the switch 30 (FIG. 1) described herein above. In general, the video stream may be transmitted from the server 40 to a given client 156 by any suitable transmission scheme, communications network, network path or other connection, including being transmitted using a link aggregation method. The connection between the server 40 and the client 156 may be referred to as a transmission link.

Each client 156 includes a client processor 160 operable to process the data packets received from the server 40 and a client memory 162 operable to store computer executable instructions for directing the client processor 160. The client processor 160 may be implemented or otherwise function in a manner identical, similar, analogous or different to that of the server processor 44 (FIG. 1) or the CPU 20 (FIG. 1) described herein above. Similarly, the client memory 162 may be implemented or otherwise function in a manner identical, similar, analogous or different to that of the server memory 46 (FIG. 1) or the memory 22 (FIG. 1) described herein above.

Each client 156 is preferably operable to include or have connected thereto one or more displays 164 for displaying in a viewing window (not shown) thereof one or more videos processed by the client processor 160. In the third embodiment, the video streaming system 154 is operable to produce video image data for displaying on colour displays 164, monochrome displays 164 or any combination thereof.

Methods of Streaming a Video

Figure 11:
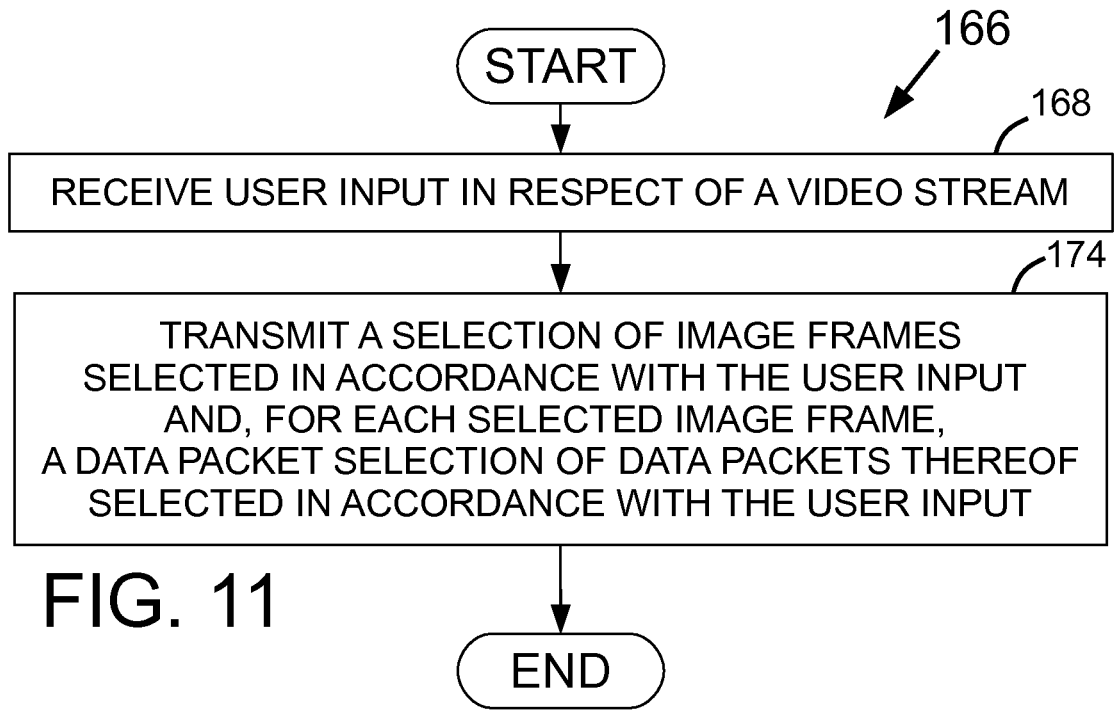
FIG. 11 is a flow diagram of a method of the system shown in FIG. 10 of streaming a video in accordance with the third embodiment.

Referring to FIG. 11, the client memory 162 in accordance with the third embodiment of the invention contains blocks of code comprising computer executable instructions for directing the client processor 160. Also, the server memory 46 in accordance with the third embodiment contains blocks of code comprising computer executable instructions for directing the server processor 44. Additionally or alternatively, such blocks of code may form part of one or more computer program products comprising computer executable instructions embodied in one or more signal bearing media, which may be one or more recordable computer-readable media or one or more signal transmission type media, for example.

When electrical power is being supplied to the client processor 160, the client memory 162, the server processor 44 and the server memory 46, the client processor 160 and the server processor 44 are directed in the third embodiment to perform respective steps of a method of the video streaming system 154 shown generally at 166.

Method 166 begins execution at block 168, which directs at least one of the client processor 160 and the server processor 44 to receive user input in respect of a video stream. In the third embodiment, the necessary computer executable instruction codes for executing block 168 are stored in the client memory 162 for directing the client processor 160 to receive the user input. Additionally or alternatively, such codes may be stored in the server memory 46 for directing the server processor 44 to receive the user input. In general, either the server processor 44 and/or the client processor 160 may be operable to receive user input. For simplicity of explanation and without limiting the scope of the present invention, the description herein that follows will reference embodiments in which the client processor 160 receives the user input.

Figure 12:
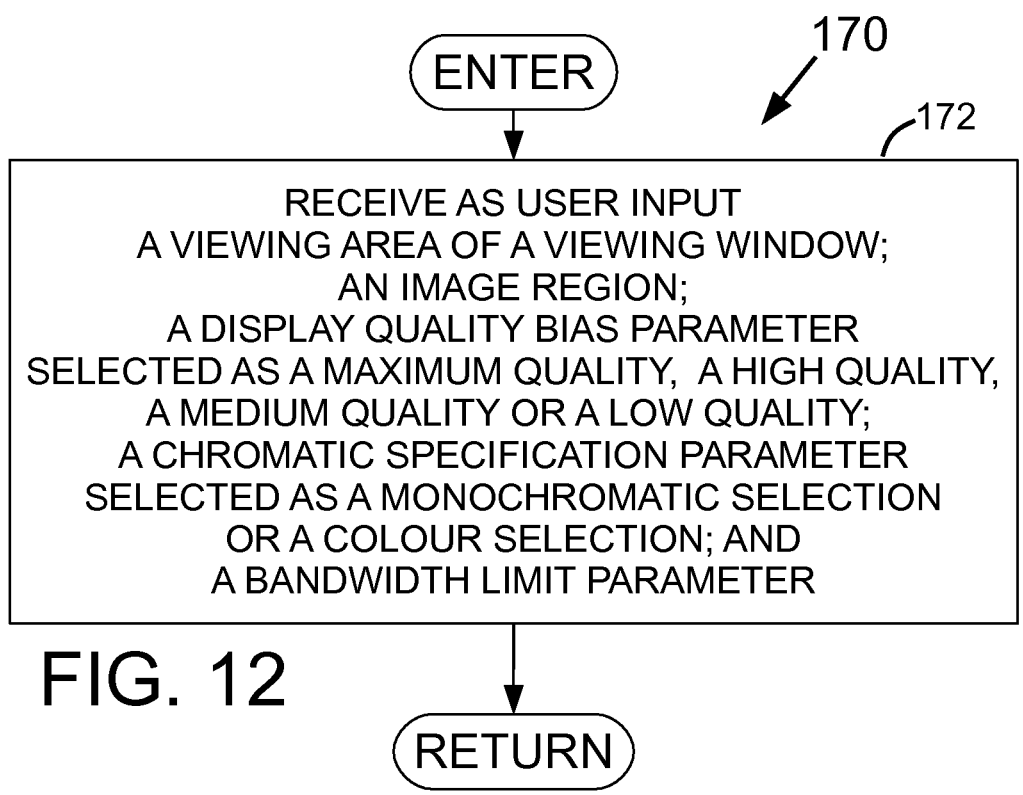
FIG. 12 is a flow diagram of an exemplary method of performing the step shown in FIG. 11 of receiving user input in respect of a video stream.

Referring to FIG. 12, an exemplary method for implementing steps of the method 166 (FIG. 11) is shown generally at 170. The method 170 begins at block 172, which directs the client processor 160 to receive as user input: (i) a viewing area of a viewing window; (ii) an image region; (iii) a display quality bias parameter; (iv) a chromatic specification parameter; and (v) a bandwidth limit parameter.

The viewing area typically represents the number of pixels present in a given viewing window (not shown in the Figures). The viewing area can be calculated as the width in pixels of the viewing window multiplied by the height in pixels of the viewing window. For example, for a viewing window of 640 pixels by 480 pixels, the viewing area is 307,200 pixels, or approximately 0.3 Megapixels. The viewing area may change dynamically as a user alters the size of a viewing window on a display 164 (FIG. 10), and the system 154 is preferably operable to adapt the video streaming in response thereto for enhanced transmission efficiency. Generally, the viewing area is constrained within the total viewing area of the display 164 (FIG. 10).

The image region typically represents a portion of an image frame of the video stream. Any coordinate system or scheme suitable for defining a region of an image frame may be employed. For example, a coordinate system for an image frame having a width of 2048 pixels and a height of 1536 pixels may define (0,0) as a coordinate for the top-left corner of the image frame and (2048, 1536) as a coordinate for the bottom-right corner of the image frame. In such exemplary coordinate system, the coordinates (384,408) and (1664,1128) specify the top-left corner and the bottom-right corner, respectively, of an image region that is centered within the image frame and has a width of 1280 pixels and a height of 720 pixels. A person of ordinary skill in the art will appreciate that an image region may be specified in a variety of ways not limited to the exemplary coordinate system described herein.

The display quality bias parameter is typically employed to represent the extent to which a user would prefer picture quality resulting from a frame rate (typically measured in frames per second) to be sacrificed to improve image quality indicated by a pixel resolution (typically measured in Megapixels), or vice versa. The display quality bias parameter may be represented in any suitable manner and include any number of selections available to a user. In the third embodiment, the display quality bias parameter is selectable from the group of maximum, high, medium and low quality. However, other selection criteria may be employed and are within the scope of the present invention.

The chromatic specification parameter typically represents whether or not to transmit colour information of a video stream, which may be instead of or in addition to transmitting monochrome information of the video stream. In the third embodiment, the data packets representing a video stream include data packets providing colour information. Transmitting colour information may involve transmitting such data packets containing the colour information. Transmitting monochrome information only may involve transmitting only data packets not containing the colour information. Additionally or alternatively, transmitting monochrome information only may involve transmitting only monochrome information portions of data packets. In the third embodiment, the chromatic specification parameter is selected from the group of monochrome selection and colour selection, however other selection groups may be suitably employed. Typically, only monochrome information of the video stream is transmitted if the user has selected the monochrome selection of the chromatic specification parameter, and the colour information is transmitted if the user has selected the colour selection of the chromatic specification parameter.

The bandwidth limit parameter typically represents a user specifiable limit of bandwidth usage permitted for the purpose of transmitting one or more video streams via a given transmission link. The bandwidth limit parameter advantageously permits a user to maintain bandwidth usage within a predetermined limit. In the third embodiment, the bandwidth limit parameter may take any positive numerical value, including a specification of unlimited bandwidth in which case the system 154 is operable to not place any limit on bandwidth usage on the basis of the bandwidth limit parameter.

Although FIG. 12 shows an exemplary method in which all of the viewing area, image region, display quality bias parameter, chromatic specification parameter and bandwidth limit parameter are received as user input by executing a single block 172 of code, it is within the scope of the present invention for different forms of user input to be received in different manners, including at different times, and by different processes or processors. For example, the system 154 in at least some embodiments is operable to permit the client processor 160 to communicate to the server 40 a request for a list of available video streams and/or available cameras 14; permit the server 40 to communicate identifications of one or more available video streams and/or available cameras 14 possibly in conjunction with other information such as pixel resolution associated with one or more of the identified available video streams; permit the client processor 160 to receive as user input respective viewing areas and image regions in respect of a number of identified video streams; and permit the client processor 160 to communicate to the server 40 one or more requests to commence streaming identified video streams. In such embodiments, the system 154 is operable to receive as user input one or more system 154 parameters, such as the display quality bias, chromatic specification and bandwidth limit parameters, at any time prior to or subsequent to communicating such requests to commence streaming. The system 154 in at least some embodiments is operable to receive and store different parameter values in respect of different identifiable video streams, including receiving and/or storing different parameter values at different times. The system 154 in at least some embodiments is operable to assign a default value to any one or more system 154 parameters, and to receive user input for overriding a system 154 default value. A default value for the bandwidth limit parameter may be unlimited bandwidth, for example. In various embodiments, received user input may be stored in the client memory 162, the server memory 46, or any combination thereof for example.

Still referring to FIG. 12, after block 172 has been executed, the method 170 ends and control is returned to the method 166 at block 174 (FIG. 11).

Referring back to FIG. 11, block 174 directs the server processor 44 to transmit a selection of image frames selected in accordance with the user input, such as may have been received by block 172 (FIG. 12), and to transmit, for each selected image frame, a data packet selection of data packets thereof selected in accordance with the user input.

Figure 13:
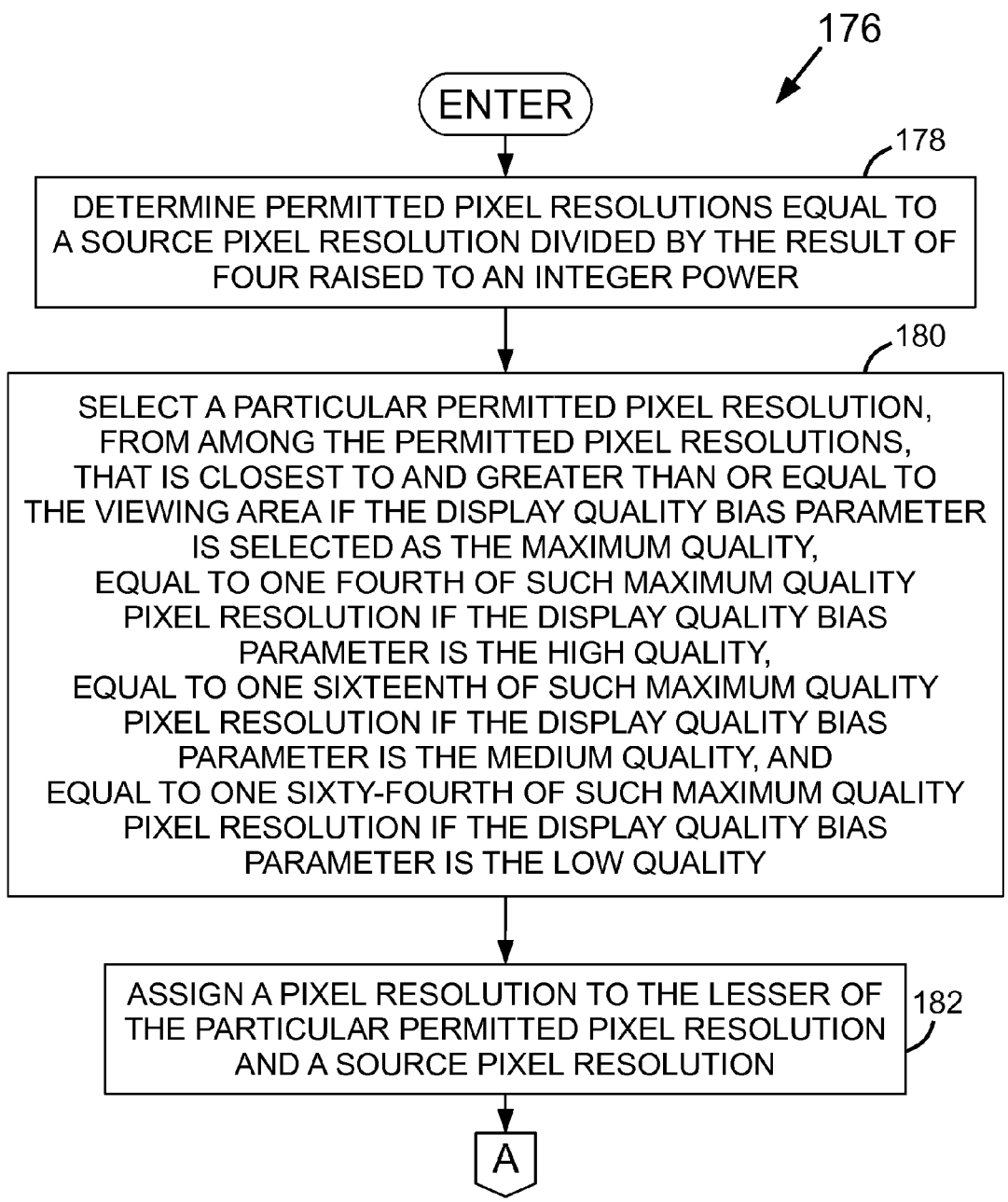
FIG. 13 is a flow diagram of an exemplary method of performing the step shown in FIG. 11 of transmitting in accordance with the user input selected data packets of selected image frames of the video stream.

Referring to FIG. 13, an exemplary method for executing steps of block 174 (FIG. 11) is shown generally at 176. The method 176 begins at block 178, which directs a suitable processor to determine permitted pixel resolutions equal to the source pixel resolution divided by the result of four raised to an integer power. In the third embodiment, such suitable processor is the client processor 160. Additionally or alternatively, the server processor 44 may perform operations directed by block 178 for example.

In the third embodiment, one or more values of permitted pixel resolutions associated with a given video stream may be determined according to the formula:

$$IR_p n = IR_0 \cdot \frac{1}{4}^n, n \in \{\ldots -2, -1, 0, 1, 2, \ldots\}$$

where $IR_p n$ are the permitted pixel resolutions, and $IR_0$ is the source pixel resolution of the given video stream.

For example, if the source pixel resolution is 4 Megapixels (MP), the permitted pixel resolutions are { ... 64 MP, 16 MP, 4 MP, 1 MP, 0.25 MP ... }. In embodiments of the invention, a plurality of permitted pixel resolutions need not be specifically computed. In such embodiments, only one particular permitted pixel resolution may be determined for example.

Block 180 in the third embodiment directs the client processor 160 to select a particular permitted pixel resolution, from among the permitted pixel resolutions, that is: (i) closest to and greater than or equal to the viewing area (which particular permitted pixel resolution may be referred to as a maximum quality pixel resolution) if the display quality bias parameter is selected as maximum quality; (ii) equal to one fourth of the maximum quality pixel resolution if the display quality bias parameter is selected as high quality; (iii) equal to one sixteenth of the maximum quality pixel resolution if the display quality bias parameter is selected as medium quality; and (iv) equal to one sixty-fourth of the maximum quality pixel resolution if the display quality bias parameter is selected as low quality. In at least some embodiments, blocks 178 and 180 may not be separately executed and a value of the integer power referenced by block 178 and corresponding to the particular permitted pixel resolution of block 180 may be determined in accordance with a single block of code.

A particular permitted pixel resolution may be selected by selecting the value of $n$ such that the formula for the permitted pixel resolutions is satisfied in accordance with the viewing area and the display quality bias parameter. By way of a first example, if the viewing area is 0.4 MP and the source pixel resolution is 4 MP, then the particular permitted pixel resolution corresponding to each of maximum, high, medium and low display quality is 1 MP, 0.25 MP, 0.0625 MP and 0.015625 MP, respectively. By way of a second example, if the viewing area is 5.2 MP and the source pixel resolution is 4 MP, then the particular permitted pixel resolution corresponding to each of maximum, high, medium and low display quality is 16 MP, 4 MP, 1 MP and 0.25 MP, respectively.

After block 180 has been executed, block 182 directs the client processor 160 to assign a pixel resolution to the lesser of the particular permitted pixel resolution and the source pixel resolution. For example, if the source pixel resolution is 4 MP and the particular permitted pixel resolution is 1 MP, then the pixel resolution is assigned the value of 1 MP, whereas if the source pixel resolution is 4 MP and the particular permitted pixel resolution is 16 MP, then the pixel resolution is assigned the value of 4 MP. Block 180 advantageously facilitates the system 154 in not attempting to transmit more pixel information than is available from a given source.

Although not shown in FIG. 13, block 182 in at least some embodiments also directs the client processor 160 to communicate the value of the pixel resolution from the client 156 to the server 40. After block 182 has been executed, block 184 is executed as shown in FIG. 14.

Figure 14:
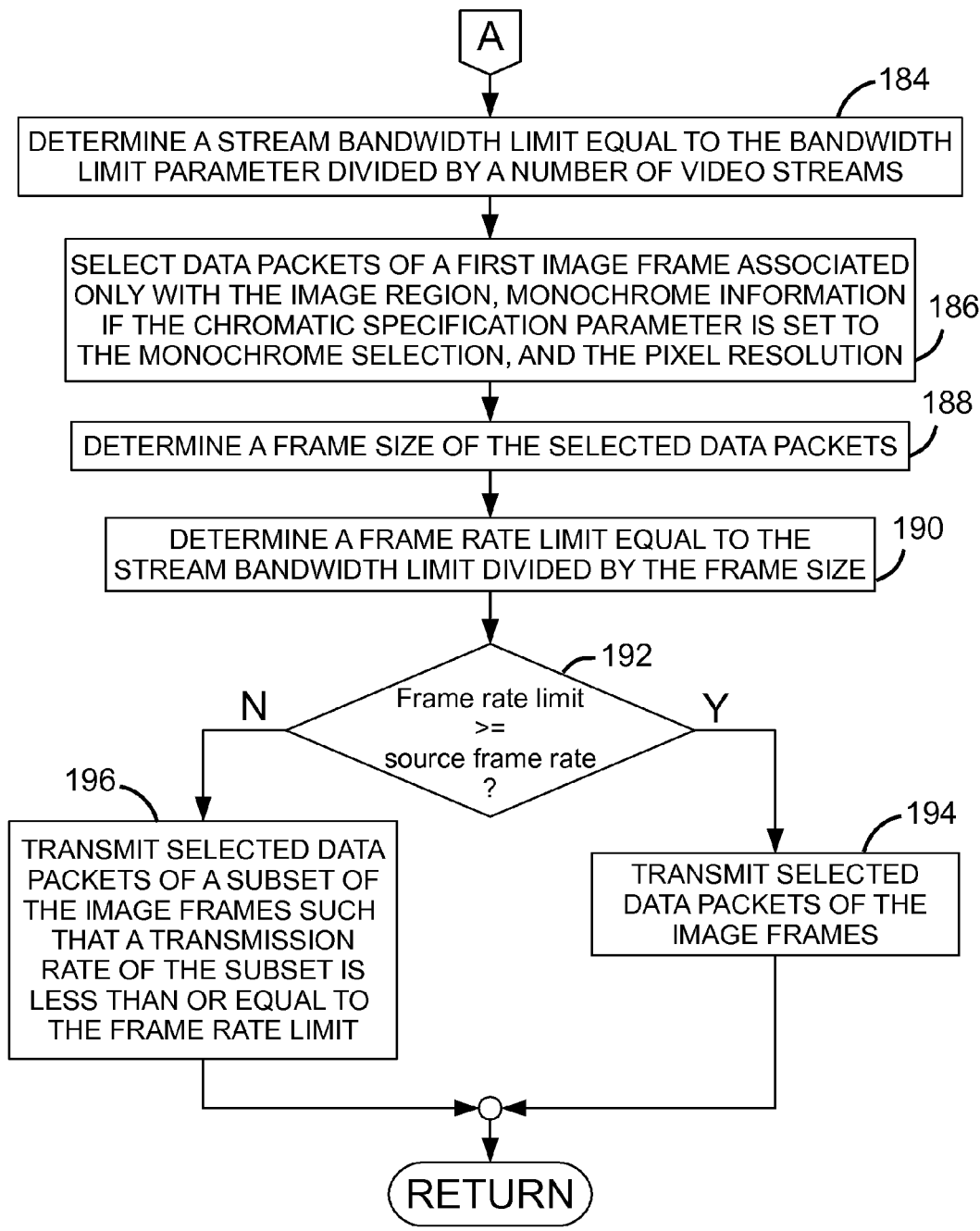
FIG. 14 is a flow diagram of an exemplary method of performing the step shown in FIG. 11 of transmitting in accordance with the user input selected data packets of selected image frames of the video stream.

Referring to FIG. 14, block 184 in accordance with the third embodiment directs the client processor 160 to determine a stream bandwidth limit equal to the bandwidth limit parameter divided by a number of video streams. In embodiments where a given client 156 is operable to receive from the server 40 a plurality of video streams, the stream bandwidth limit is determined in accordance with the number of video streams currently being received, expected to be received, requested to be received, or expected to be requested to be received, for example, by the given client 156. In variations, any suitable weighting or prioritization scheme may be employed to allocate bandwidth for use with different video streams and to determine a stream bandwidth limit for each such video stream. A weighting or prioritization for a given video stream may be determined in accordance with user input, for example. The same stream bandwidth limit being employed in respect of a plurality of video streams, a unique stream bandwidth limit being employed for each video stream, and any combination thereof is within the scope contemplated by the present invention. Although not shown in FIG. 14, block 184 in at least some embodiments also directs the client processor 160 to communicate the value of the stream bandwidth limit from the client 156 to the server 40.

While blocks 178 to 184 are described herein above as directing the client processor 160, it is within the scope of the present invention for such blocks to direct the server processor 44. In embodiments where one or more of blocks 178 to 184 direct the server processor 44, the server 40 is preferably operable to receive user input from a user, from one or more clients 156, or both from a user and one or more clients 156.

Block 186 in accordance with the third embodiment directs the server processor 44 to select data packets of a first image frame of a given video stream such that the selected data packets are associated only with the image region, monochrome information if the chromatic specification parameter is set to the monochrome selection, and the pixel resolution (such as that determined by block 182). Executing block 186 advantageously enhances transmission efficiency by not selecting data packets for transmission from the server 40 to the client 156 that the client 156 has indicated will not be displayed. In some embodiments, portions of data packets are not transmitted in accordance with indications received from the client 156. In a variation, block 186 directs the server processor 44 to select data packets, or portions thereof, of the first image frame such that the selected data packets are associated only with the image region and the pixel resolution, without regard to any chromatic specification.

In some embodiments, block 186 directs the server processor 44 to determine the compression of the first image frame of the given video stream; compare the compression to a minimum permitted compression; and, if the compression is less than the minimum permitted compression, adjust the compression of the first image frame such that the compression becomes equal to or greater than the minimum permitted compression. Determining the compression of a given image frame may involve determining the number of data bits used to digitally represent each pixel of the given image frame. Adjusting the compression of a given image frame may involve reducing the number of bits per pixel of the given image frame. Additionally or alternatively, adjusting the compression of the given image frame may involve increasing the number of bits per pixel of the given image frame. The minimum permitted compression may be a system 154 parameter, including possibly being a user specifiable parameter for example. The system 154 may include a user specifiable parameter for enabling and disabling the system 154 feature of determining and possibly altering the compression of image frames of a given video stream.

Block 188 in the third embodiment directs the server processor 44 to determine a frame size of the selected data packets. In general, frame size typically represents the number of bytes of data associated with a given frame. In the third embodiment, the frame size of the selected data packets selected by block 186 in respect of the first image frame advantageously provides an indication of the amount of data constituted by the first image frame. In variations, block 188 may direct the server processor 44 to determine an average frame size of data packets selected in accordance with block 186 in respect of a plurality of image frames, thereby advantageously reducing an error margin of the frame size.

Block 190 in the third embodiment directs the server processor 44 to determine a frame rate limit equal to the stream bandwidth limit (such as that determined by block 184) divided by the frame size (such as that determined by block 188). In embodiments and circumstances in which the stream bandwidth limit is indicative of an unlimited bandwidth (for example, by no finite bandwidth limit having been set by the user), the frame rate limit may be assigned a representation of an infinite value or other indication that no finite frame rate limit is being set.

In some embodiments, block 190 directs the server processor 44 to determine whether the frame rate limit is less than a minimum permitted frame rate limit and, if so, adjust the frame size such that the frame rate limit becomes equal to or greater than the minimum permitted frame rate limit. Adjusting the frame size may involve reducing the frame size by increasing the compression associated with the selected data packets. Additionally or alternatively, adjusting the frame size may involve increasing the frame size by reducing the compression associated with the selected data packets, for example. Changing the compression may involve changing the selection of data packets, decompressing data packets and re-compressing the data packets at a new compression rate, applying a compression change algorithm to the selected data packets, or any combination thereof for example. The minimum permitted frame rate limit may be a system 154 parameter, including possibly being a user specifiable parameter for example. The system 154 may include a user specifiable parameter for enabling and disabling the system 154 feature of comparing the frame rate limit to the minimum permitted frame rate limit and possibly altering the compression of image frames of a given video stream accordingly.

Block 192 in the third embodiment directs the server processor 44 to determine whether the frame rate limit is greater than or equal to the source frame rate.

If the frame rate limit is greater than or equal to the source frame rate, block 194 directs the server 44 to transmit selected data packets of the image frames of the video stream. In the third embodiment, such data packets for each image frame are selected in a manner substantially similar to the selection of data packets of the first image frame in accordance with block 186. In accordance with block 194, the selected data packets of all image frames of the video stream are transmitted.

If the frame rate limit is less than the source frame rate, block 196 directs the server processor 44 to transmit selected data packets of a subset of the image frames of the video stream such that the transmission rate of the selected image frames is less than or equal to the frame rate limit. (For each image frame, such data packets may be selected for transmission in a manner substantially similar to the selection of data packets of the first image frame in accordance with block 186.) The image frames of the subset are preferably selected for transmission such that the transmission rate at which the selected image frames are transmitted is equal to or approximately equal to, but no greater than, the frame rate limit. For example, if the source frame rate is 30 frames per second, and the frame rate limit is calculated as 7.6 frames per second, then transmitting 7 image frames for every 30 image frames of the video stream will result in a transmission rate that is less than or equal to the frame rate limit. Similarly, transmitting 15 image frames for every 60 image frames of the video stream will also result in a transmission rate that is less than or equal to the frame rate limit. A person of ordinary skill in the art will appreciate that numerous selections of image frames of the subset may result in a transmission rate less than or equal to the frame rate limit.

Executing block 196 advantageously enhances transmission efficiency by not transmitting image frames from the server 40 to the client 156 that the client 156 has indicated will not be displayed.

In the third embodiment, the server processor 44 is preferably operable to select the subset so as to produce a substantially uniform temporal distribution of the selected image frames. For example, 7 of every 30 image frames may be transmitted by repeating the pattern of transmitting every fourth image frame for five such transmissions followed by transmitting every fifth image frame for two such transmissions.

After executing block 194 or block 196, the method 176 ends and the process returns to the method 166 (FIG. 11), which also ends.

While not shown in the Figures, the system 154 is in at least some embodiments operable to iteratively execute methods of streaming a video described herein for multiple video streams in respect of multiple clients 156, multiple servers 44, multiple sources such as the cameras 14, and any combination thereof.

While not shown in the Figures, the system 154 is preferably operable to iterate one or more steps of the method 166 such that one or more quantities, such as the stream bandwidth limit, are adjusted in response to the client 156 receiving data packets. In exemplary circumstances where the client 156 is not rendering all received data packets for display due to processing speed limitations, for example, the client 156 may be operable to adjust the stream bandwidth limit, including possibly transmitting a new value of the stream bandwidth limit to the server 44. The server 44 in at least some embodiments is operable to perform a redetermination of the frame rate limit, thereby adapting the transmission frame rate of the selected image frames for continuously adaptable transmission efficiency.

Furthermore, the system 154 is in at least some embodiments operable to receive subsequent user input and to cause redeterminations of the selection of data packets, the selection and/or compression of image frames, the selection of the video stream, and any combination thereof for example.

Thus, there is provided a method of streaming a video, the video comprising a plurality of image frames having associated therewith a source frame rate, each said image frame having associated therewith a source pixel resolution, each said image frame comprising a plurality of data packets, the method comprising: (a) receiving as user input a viewing area of a viewing window, an image region, and a display quality bias; and (b) transmitting a selection of said image frames and, for each said selected image frame, transmitting a data packet selection of said data packets associated only with said image region and a pixel resolution determined in response to said viewing area, said display quality bias and said source pixel resolution.

While embodiments of the invention have been described and illustrated, such embodiments should be considered illustrative of the invention only. The invention may include variants not described or illustrated herein in detail. For example, an image captured by a given camera may be selected by the user, or by the server processor in accordance with user settings, for use by the given camera as its reference image. Thus, the embodiments described and illustrated herein should not be considered to limit the invention as construed in accordance with the accompanying claims.

What is claimed is:

1. A method of streaming a video to permit displaying of the video on a display, the video comprising a plurality of image frames having associated therewith a source frame rate, each said image frame having associated therewith a source pixel resolution, each said image frame comprising a plurality of data packets, the method comprising:
   (a) receiving as user input a viewing area of a viewing window associated with the display; and
   (b) transmitting a selection of said image frames and, for each said selected image frame, transmitting a data packet selection of said data packets associated only with a pixel resolution determined in response to said viewing area.

2. The method of claim 1 wherein step (a) further comprises receiving as user input an image region, and wherein step (b) comprises transmitting said data packet selection associated only with said image region.

3. The method of claim 2 wherein step (a) further comprises receiving as user input a display quality bias, and wherein step (b) comprises transmitting said data packet selection associated only with said image region and said pixel resolution determined in response to said viewing area and said display quality bias.

4. The method of claim 3 wherein step (b) comprises transmitting said data packet selection associated only with said image region and said pixel resolution determined in response to said viewing area, said display quality bias and said source pixel resolution.

5. The method of claim 3 wherein step (a) comprises receiving as user input said display quality bias selected from the group consisting of: a maximum quality, a high quality, a medium quality and a low quality, wherein step (b) comprises determining a permitted pixel resolution equal to said source pixel resolution divided by the result of four raised to an integer power, and determining said integer power such that said permitted pixel resolution is equal to a particular said permitted pixel resolution closest to and greater than or equal to said viewing area if said display quality bias is selected as said maximum quality, equal to one fourth of said particular permitted pixel resolution if said display quality bias is selected as said high quality, equal to one sixteenth of said particular permitted pixel resolution if said display quality bias is selected as said medium quality and equal to one sixty-fourth of said particular permitted pixel resolution if said display quality bias is selected as said low quality, and wherein the method further comprises assigning said pixel resolution to the lesser of said permitted pixel resolution and said source pixel resolution.

6. The method of claim 1 further comprising, after determining said pixel resolution, receiving as user input a new viewing area and transmitting a subsequent said data packet selection of said data packets associated only with a new pixel resolution determined in response to said new viewing area.

7. The method of claim 1 wherein step (a) comprises receiving said viewing area by a client, wherein step (b)

comprises transmitting said data packet selection to said client, and further comprising displaying by said client the video on the display.

8. The method of claim 1 wherein step (a) further comprises receiving as user input a chromatic specification selected from the group consisting of a monochromatic selection and a colour selection, and wherein step (b) comprises transmitting only monochrome information of the video if said chromatic specification is selected as said monochrome selection.

9. The method of claim 1 wherein step (b) comprises adjusting a compression of said image frames such that said compression is equal to or greater than a minimum compression.

10. The method of claim 1 wherein step (b) comprises selecting said selection of said image frames such that a stream bandwidth limit is not exceeded.

11. The method of claim 10 wherein selecting said selection of said image frames such that a stream bandwidth limit is not exceeded comprises receiving as user input a bandwidth limit associated with a transmission link, and setting said stream bandwidth limit equal to said bandwidth limit divided by a number of said videos being transmitted via said transmission link.

12. The method of claim 10 wherein selecting said selection of said image frames such that a stream bandwidth limit is not exceeded comprises determining a frame size of said data packet selection, determining a frame rate limit equal to said stream bandwidth limit divided by said frame size, selecting said image frames if said frame rate limit is greater than or equal to said source frame rate, and, if said frame rate limit is less than said source frame rate, selecting a subset of said image frames such that a transmission rate of said subset is less than or equal to said frame rate limit.

13. The method of claim 12 wherein determining a frame rate limit equal to said stream bandwidth limit divided by said frame size comprises adjusting said frame size such that said frame rate limit is equal to or greater than a minimum frame rate limit.

14. The method of claim 12 wherein selecting a subset of said image frames such that a transmission rate of said subset is less than or equal to said frame rate limit comprises selecting said subset such that said subset constitutes a substantially uniform temporal distribution of said image frames.

15. The method of claim 12 wherein determining a frame size of said data packet selection comprises determining an average frame size associated with a plurality of said image frames.

16. A system for streaming a video to permit displaying of the video on a display, the video comprising a plurality of image frames having associated therewith a source frame rate, each said image frame having associated therewith a source pixel resolution, each said image frame comprising a plurality of data packets, the system comprising:
(a) a client operable to receive as user input a viewing area of a viewing window associated with the display; and
(b) a controller device operable to transmit a selection of said image frames to said client and, for each said selected image frame, transmitting a data packet selection of said data packets associated only with a pixel resolution determined by the system in response to said viewing area.

17. The system of claim 16 wherein said client is operable to receive as user input an image region, and wherein said controller device is operable to transmit said data packet selection associated only with said image region.

18. The system of claim 17 wherein said client is operable to receive as user input a display quality bias, and wherein said controller device is operable to transmit said data packet selection associated only with said image region and said pixel resolution determined by the system in response to said viewing area and said display quality bias.

19. The system of claim 18 wherein said controller device is operable to transmit said data packet selection associated only with said image region and said pixel resolution determined by the system in response to said viewing area, said display quality bias and said source pixel resolution.

20. The system of claim 18 wherein said client is operable to receive as user input said display quality bias selected from the group consisting of: a maximum quality, a high quality, a medium quality and a low quality, wherein said client is operable to determine a permitted pixel resolution equal to said source pixel resolution divided by the result of four raised to an integer power, said client is operable to determine said integer power such that said permitted pixel resolution is equal to a particular said permitted pixel resolution closest to and greater than or equal to said viewing area if said display quality bias is selected as said maximum quality, equal to one fourth of said particular permitted pixel resolution if said display quality bias is selected as said high quality, equal to one sixteenth of said particular permitted pixel resolution if said display quality bias is selected as said medium quality and equal to one sixty-fourth of said particular permitted pixel resolution if said display quality bias is selected as said low quality, said client is operable to assign said pixel resolution to the lesser of said permitted pixel resolution and said source pixel resolution, and wherein said client is operable to communicate to said controller device said pixel resolution.

21. The system of claim 16 wherein said client is operable, after said pixel resolution is determined, to receive as user input a new viewing area, and wherein said controller device is operable to transmit a subsequent said data packet selection of said data packets associated only with a new pixel resolution determined by the system in response to said new viewing area.

22. The system of claim 16 wherein the display is included in or connected to said client and said client is operable to display the video in said viewing area of said viewing window on the display.

23. The system of claim 16 wherein said client is operable to receive as user input a chromatic specification selected from the group consisting of a monochromatic selection and a colour selection, and wherein said controller device is operable to transmit monochrome information only of the video when said chromatic specification is selected as said monochrome selection.

24. The system of claim 16 wherein said controller device is operable to adjust a compression of said image frames such that said compression is equal to or greater than a minimum compression.

25. The system of claim 16 wherein said controller device is operable to select said selection of said image frames such that a stream bandwidth limit is not exceeded.

26. The system of claim 25 wherein said client is operable to receive as user input a bandwidth limit associated with a transmission link, operable to set said stream bandwidth limit equal to said bandwidth limit divided by a number of said videos being received by said client via said transmission link, and operable to communicate to said controller device said stream bandwidth limit.

27. The system of claim 25 wherein said controller device is operable to determine a frame size of said data packet selection, determine a frame rate limit equal to said stream bandwidth limit divided by said frame size, select said image frames if said frame rate limit is greater than or equal to said source frame rate, and, if said frame rate limit is less than said source frame rate, select a subset of said image frames such that a transmission rate of said subset is less than or equal to said frame rate limit.

28. The system of claim 27 wherein said controller is operable to adjust said frame size such that said frame rate limit is equal to or greater than a minimum frame rate limit.

29. The system of claim 27 wherein said controller device is operable to select said subset such that said subset constitutes a substantially uniform temporal distribution of said image frames.

30. The system of claim 27 wherein said controller device is operable to determine an average frame size associated with a plurality of said image frames.

31. A system for streaming a video to permit displaying of the video on a display, the video comprising a plurality of image frames having associated therewith a source frame rate, each said image frame having associated therewith a source pixel resolution, each said image frame comprising a plurality of data packets, the system comprising:
  (a) receiving means for receiving as user input a viewing area of a viewing window associated with the display; and
  (b) transmitting means for transmitting a selection of said image frames and, for each said selected image frame, transmitting a data packet selection of said data packets associated only with a pixel resolution determined by the system in response to said viewing area.

32. The system of claim 31 wherein said receiving means is operable to receive as user input an image region, and wherein said transmitting means is operable to transmit said data packet selection associated only with said image region.

33. The system of claim 32 wherein said receiving means is operable to receive as user input a display quality bias, and wherein said transmitting means is operable to transmit said data packet selection associated only with said image region and said pixel resolution determined by the system in response to said viewing area and said display quality bias.

34. The system of claim 33 wherein said transmitting means is operable to transmit said data packet selection associated only with said image region and said pixel resolution determined by the system in response to said viewing area, said display quality bias and said source pixel resolution.

35. The system of claim 31 wherein said receiving means is operable, after said pixel resolution is determined, to receive as user input a new viewing area, and wherein said transmitting means is operable to transmit a subsequent said data packet selection of said data packets associated only with a new pixel resolution determined by the system in response to said new viewing area.

36. The system of claim 31 wherein said receiving means is operable to display the video in said viewing area of said viewing window on the display.

37. The system of claim 31 wherein said receiving means is operable to receive as user input a chromatic specification selected from the group consisting of a monochromatic selection and a colour selection, and wherein said transmitting means is operable to transmit monochrome information only of the video when said chromatic specification is selected as said monochrome selection.

38. The system of claim 31 comprising data packet selecting means for selecting said data packet selection.

39. The system of claim 38 comprising frame selecting means for selecting said selected image frames.

40. The system of claim 31 comprising frame selecting means for selecting said selected image frames.

* * * * *